(12) United States Patent
Koppelaar et al.

(10) Patent No.: US 11,904,501 B2
(45) Date of Patent: *Feb. 20, 2024

(54) MOBILE AGGREGATE HOPPER WITH ARCUATE SIDE WALLS

(71) Applicant: Bay-Lynx Manufacturing Inc., Ancaster (CA)

(72) Inventors: Greg Koppelaar, Brantford (CA); Kevin Koppelaar, Ancaster (CA); Mark Pennings, Lynden (CA); Ron Dorombozi, Puslinch (CA); Gregory D. Gall, Woodstock (CA); Nathan den Hollander, Brantford (CA)

(73) Assignee: Bay-Lynx Manufacturing Inc., Ancaster (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,609

(22) Filed: Nov. 1, 2022

(65) Prior Publication Data

US 2023/0090240 A1 Mar. 23, 2023

Related U.S. Application Data

(63) Continuation of application No. 16/908,962, filed on Jun. 23, 2020, now Pat. No. 11,518,065.

(Continued)

(51) Int. Cl.
*B28C 7/06* (2006.01)
*B28C 7/10* (2006.01)
(Continued)

(52) U.S. Cl.
CPC .............. *B28C 7/067* (2013.01); *B01F 23/59* (2022.01); *B01F 35/71731* (2022.01);
(Continued)

(58) Field of Classification Search
CPC ........... B28C 7/067; B28C 7/10; B28C 9/004; B28C 7/0069; B28C 7/0084;
(Continued)

(56) References Cited

U.S. PATENT DOCUMENTS 1,925,541 A * 9/1933 Noble .................... B28C 7/0069
222/531
2,478,079 A * 8/1949 Beasley ............ B01F 35/71731
222/413

(Continued)

FOREIGN PATENT DOCUMENTS

CA 3084647 A1 * 12/2020 .......... B01F 15/0235
DE 102005019826 A1 * 11/2006 ........... A23N 17/007
WO WO-2021001675 A1 * 1/2021

*Primary Examiner* — Charles Cooley

(57) ABSTRACT

A mobile aggregate hopper for a volumetric and gravimetric mixer having arcuate longitudinal walls for holding and isolating aggregate. The mobile aggregate hopper has a base integral with the arcuate longitudinal walls with an aggregate transfer conveyor capable of attachment to a trailer or chassis having wheels. The single sheet structure of the longitudinal arcuate side walls minimizes welding and (Continued)

mechanical joints during manufacturing and provides a hopper with high strength and capacity and low overall weight.

19 Claims, 16 Drawing Sheets

Related U.S. Application Data

(60) Provisional application No. 62/866,322, filed on Jun. 25, 2019.

(51) Int. Cl.
*B28C 9/00* (2006.01)
*B01F 23/50* (2022.01)
*B01F 35/71* (2022.01)
*B01F 101/28* (2022.01)

(52) U.S. Cl.
CPC .. *B01F 35/71775* (2022.01); *B01F 35/71815* (2022.01); *B28C 7/10* (2013.01); *B28C 9/004* (2013.01); *B01F 2101/28* (2022.01)

(58) Field of Classification Search
CPC ....... B28C 9/0463; B28C 9/046; B01F 23/59; B01F 35/71731; B01F 35/71775; B01F 35/71815; B01F 2101/28; B01F 33/502; B01F 33/50; Y02W 30/91
USPC .......... 366/1–68, 154.1–158.4, 183.1–183.4; 198/550.1
See application file for complete search history.

(56) References Cited

U.S. PATENT DOCUMENTS

| | | | | |
|---|---|---|---|---|
| 3,498,486 | A * | 3/1970 | Freeman, Jr. | B60P 1/38 414/469 |
| 4,432,499 | A * | 2/1984 | Henkensiefken | B01F 33/5023 241/101.8 |
| 4,579,459 | A * | 4/1986 | Zimmerman | B28C 9/0463 366/186 |
| 4,624,575 | A * | 11/1986 | Lantz | B28C 9/0463 366/38 |
| 4,922,463 | A * | 5/1990 | Del Zotto | B28C 9/0463 366/186 |
| 5,967,655 | A * | 10/1999 | Hills | B28C 7/0084 366/35 |
| 5,971,600 | A * | 10/1999 | Paterson | B01F 33/26 366/150.1 |
| 6,991,361 | B2 * | 1/2006 | Flood | B28C 9/004 366/65 |
| 8,177,414 | B1 * | 5/2012 | Wenger | B01F 27/702 366/186 |
| 9,616,592 | B1 * | 4/2017 | Holcombe | B65G 21/00 |
| 9,993,944 | B2 * | 6/2018 | Paige | B28C 5/38 |
| 10,583,581 | B2 * | 3/2020 | Hernandez | B28C 5/386 |
| 11,518,065 | B2 * | 12/2022 | Koppelaar | B01F 35/71775 |
| 11,833,714 | B2 * | 12/2023 | Chavez | B28C 7/10 |
| 2007/0189109 | A1 * | 8/2007 | Long | B28C 9/0463 366/42 |
| 2020/0223097 | A1 * | 7/2020 | Koppelaar | B28C 7/02 |
| 2020/0406502 | A1 * | 12/2020 | Koppelaar | B01F 35/71815 |
| 2023/0090240 | A1 * | 3/2023 | Koppelaar | B28C 7/0084 |

* cited by examiner

MOBILE AGGREGATE HOPPER WITH ARCUATE SIDE WALLS

CROSS REFERENCE TO RELATED APPLICATION

This application claims priority to U.S. provisional patent application Ser. No. 62/866,322 filed on Jun. 25, 2019, and is a continuation of U.S. patent application Ser. No. 16/908,962 filed on Jun. 23, 2020, the contents of both of which are hereby incorporated by reference in their entirety.

FIELD OF THE INVENTION

The present invention pertains to a mobile aggregate hopper for a volumetric and gravimetric mixer with an arcuate wall design. In particular, the volumetric aggregate hopper has arcuate longitudinal side walls defining one or more aggregate and material reservoirs or bins.

BACKGROUND

Volumetric and gravimetric mixers are used for on-site mixing of a variety of solid and liquid materials. In the concrete industry, volumetric mixers mix cementitious materials with aggregates and liquids to produce hardening concretes. Volumetric and gravimetric concrete mixers often contain separate compartments or reservoirs for different aggregates such as sand and stone, cementitious materials such as Portland cement and fly ash, liquids such as water, and other characteristic altering additives. One type of volumetric mixer is a mobile concrete mixer for on-site mixing or manufacturing and delivery of concrete. Stationary volumetric mixers are also known for mixing concrete and other materials. Gravimetric measurement can also be used in combination with volumetric methods where weighing of components, in particular solid materials, is used to accurately portion out mix materials. Volumetric mixers are capable of continuously delivering specific, controllable, volumes of accurately mixed material at a constant rate, and can be thought of as mobile plants capable of delivering freshly prepared concrete and other cementitious products of a custom mix design directly at a job site. Non-limiting examples of cementitious products are grout, mortar, concrete of various hardnesses and compositions, slump, flowable fill, cellular concrete, urethane modified concrete, soil, cement, and specialty formulations of the same.

A volumetric concrete mixer precisely meters out cementitious materials, sand, stone, water and other additives on-site such that the cementitious product that is produced is an accurate reflection of the desired mix design and that the quantity that is produced is an accurate reflection of the job requirement with minimal waste. Specialty mix designs with more or fewer ingredients can also readily formulated and can be modified dynamically during a pour. Accurate volumetric ratioing and measuring in a volumetric mixer control is important for achieving a uniform, consistent and predictable quality of dispensed cementitious product or concrete that matches a set and repeatable standard.

Various styles of aggregate hoppers are known for preparation of cementitious materials. In one example, U.S. Pat. No. 6,991,361 to Flood describes a portable concrete plant having material storage regions for storing components used in ready mix concrete including a portland cement storage region, a sand storage region, a rock storage region, and a water storage region.

In another example described in U.S. Pat. No. 4,579,459 to Zimmerman, an angular aggregate hopper is provided with two longitudinally-extending aggregate bins separated by a common wall and having a common bottom trough at the narrowest region of the aggregate hopper. The bottom walls of the trough are oppositely-inclined from one another so as to slope downwardly in converging fashion.

In another example, U.S. Pat. No. 9,616,592 to Holcombe et al. describes a materials mixing system having a plurality of bins disposed over a conveyor assembly, where the conveyor assembly is removably engaged and removable as a unitary module from the materials mixing system.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a mobile aggregate hopper for a volumetric and gravimetric mixer. In particular, the mobile aggregate hopper has two arcuate longitudinal side walls and an integrated base for housing an aggregate conveyor.

In an aspect there is provided a mobile aggregate hopper comprising: a pair of arcuate longitudinal side walls; a front end wall between the pair of longitudinal walls; a rear end wall between the pair of longitudinal walls; a transverse interior divider wall extending between the pair of arcuate longitudinal side walls defining a cementitious material bin; a longitudinal divider wall extending between the front end wall and the transverse interior divider wall defining two aggregate bins; a conveyor assembly disposed below the two aggregate bins operable to receive aggregate material from the two aggregate bins; and an integrated base enclosing the conveyor assembly, the integrated base comprising walls continuous with the longitudinal side walls.

In another aspect there is provided a volumetric mixer comprising: a mobile aggregate hopper comprising: a pair of arcuate longitudinal side walls; a front end wall between the pair of longitudinal walls; a rear end wall between the pair of longitudinal walls; a transverse interior divider wall extending between the pair of arcuate longitudinal side walls defining a cementitious material bin; a longitudinal divider wall extending between the front end wall and the transverse interior divider wall defining two aggregate bins; a conveyor assembly disposed below the two aggregate bins operable to receive aggregate material from the two aggregate bins; and an integrated base enclosing the conveyor assembly, the integrated base comprising walls continuous with the longitudinal side walls; a liquid storage tank; and a chassis comprising wheels for supporting the mobile aggregate hopper.

In another aspect there is provided a mobile aggregate hopper comprising a pair of longitudinal side walls, a front end wall between the pair of longitudinal walls, a rear end wall between the pair of longitudinal walls, a transverse interior divider wall extending between the pair of longitudinal side walls defining a cementitious material bin, a longitudinal divider wall extending between the front end wall and the transverse wall defining two aggregate bins, an integrated conveyor assembly disposed over the two aggregate bins operable to receive aggregate material from the two aggregate bins, an integrated base enclosing the integrated conveyor assembly.

In an embodiment, the pair of longitudinal side walls are arcuate.

In another embodiment, the pair of longitudinal side walls, front end wall and rear end wall comprise double walled aluminum panels.

In another embodiment, the longitudinal divider wall is arcuate.

In another embodiment, the two aggregate bins are of different sizes.

In another embodiment, the pair of longitudinal side walls, front end wall and a rear end wall are of a unitary construction.

In another embodiment, the lateral interior divider wall, pair of arcuate longitudinal side walls, and rear end wall define a material storage bin.

In another embodiment, the material storage bin is a cementitious material storage bin.

In another embodiment, the hopper further comprises at least one transfer conveyor for transferring aggregate out of the hopper.

In another embodiment, the rear end wall is arcuate.

In another embodiment, the hopper further comprises a plurality of arcuate support braces.

In another embodiment, the arcuate longitudinal side walls are shaped by step bending.

In another embodiment, the hopper further comprises one or more vibrators.

In another embodiment, the hopper further comprises at least one base brace, the base brace extending from one of the pair of longitudinal side walls to the longitudinal divider wall.

In another aspect there is provided a volumetric mixer comprising a mobile aggregate hopper comprising: a pair of longitudinal side walls, a front end wall between the pair of longitudinal walls, a rear end wall between the pair of longitudinal walls, a transverse interior divider wall extending between the pair of longitudinal side walls defining a cementitious material bin, a longitudinal divider wall extending between the front end wall and the transverse wall defining two aggregate bins, an integrated conveyor assembly disposed over the two aggregate bins operable to receive aggregate material from the two aggregate bins, and an integrated base enclosing the integrated conveyor assembly, and a chassis comprising wheels for supporting the mobile aggregate hopper.

In another aspect there is provided a volumetric mixer comprising: an aggregate reservoir comprising: a pair of arcuate longitudinal side walls; a front end wall extending between the pair of longitudinal walls; a rear end wall extending between the pair of longitudinal walls; a hopper roof extending between the pair of arcuate longitudinal side walls, the front end wall and the rear end wall; and an integrated base continuous with the longitudinal side walls; a conveyor assembly housed inside the integrated base operable to receive aggregate material from the aggregate reservoir; a liquid storage tank; and a discharge auger for receiving aggregate material from the conveyor assembly.

In an embodiment, the hopper roof is arcuate.

In another embodiment, the hopper roof comprises one or more hatches.

In another embodiment, the aggregate reservoir comprises more than one reservoir for storing aggregate cementitious material, sand, or a combination thereof.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
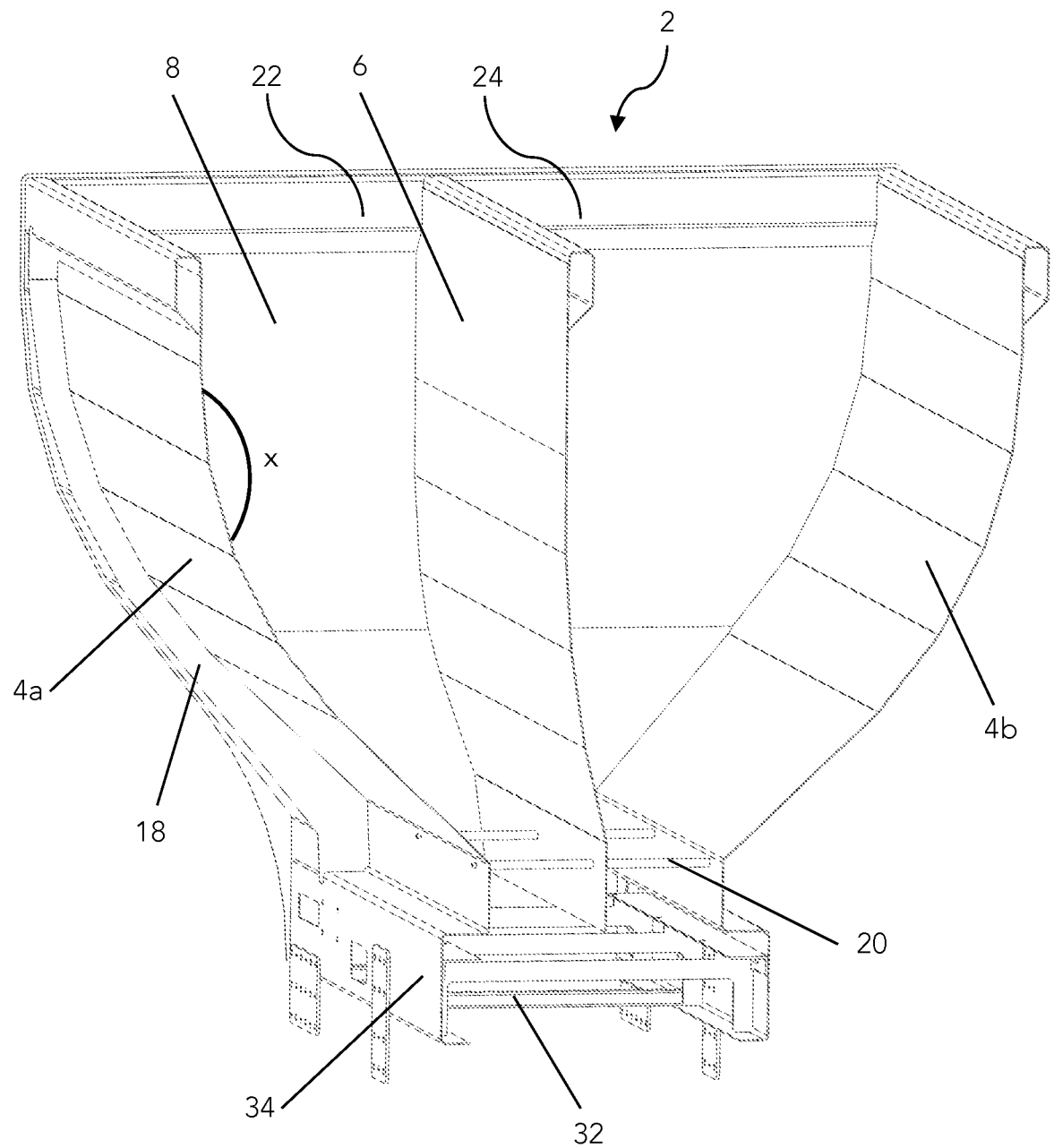
FIG. 1 is a side cross-sectional perspective view of an arcuate aggregate hopper with arcuate interior divider wall.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

As used herein, the term "volumetric mixer" refers to any mobile or stationary mixer that mixes solid and liquid materials in a defined ratio. A volumetric mixer can also refer to a mixer having gravimetric controls instead of or in addition to volumetric controls for materials to be ratioed by weight.

As used herein, the terms "cementitious material" and "cement" refer to any binder or substance that sets, hardens, and adheres to other materials to bind them together. Cementitious products are mixtures of cementitious materials and non-cementitious materials such as aggregates, and the cementitious material in the mixture hold everything together as the mixture hardens. Cementitious materials include but are not limited to traditional Portland cement, fly ash, ground granulated blast furnace slag (GGBS), limestone fines and silica fume. Non-cementitious materials include but are not limited to aggregates, water and other admixtures such as performance modifiers. Aggregates may include but are not limited to sand, gravel, stone, biological material, recycled material bulk, and synthetic material bulk.

As used herein, the term "cementitious product" refers to a composite material comprising aggregate, cementitious material, and water, that hardens upon curing, one example of which is concrete. Cementitious products can be comprised of a wide variety of aggregates in variable sizes and ratios depending on the application, and can also contain other additives such as but not limited to fibers, polymers, adhesives, and binders such as urethanes. Concrete is a type of cementitious product which typically includes both sand, gravel and Portland cement. The term concrete is used herein to refer to the product of the volumetric mixer, however it is understood that other types of non-concrete cementitious products can also be prepared by the volumetric mixer.

Herein is described a mobile aggregate hopper for a volumetric or gravimetric mixer having arcuate longitudinal walls made from a single sheet structure and encasing an integrated conveyor assembly. The single sheet structure of the longitudinal arcuate side walls minimizes welding and mechanical joints during manufacturing and provides a hopper with high strength and capacity with low overall weight. The arcuate shape, meaning shaped like a bow or curved, is enabled in one embodiment by the use of a single bent or curved piece of high performance steel to form each longitudinal hopper wall. However it is conceived that other materials may also be used, as well as other designs that achieve an arcuate hopper wall shape, such as by welding, bonding, or form fitting.

The arcuate walls of the hopper can be designed such that the majority of the bin content capacity is held at an angle greater than the expected angle of repose for the particulate contents, thus enabling reduced use of vibrators during material transfer or discharge. The angle of repose is the steepest angle at which a sloping surface formed of a particulate loose material is stable and to which a material can be stably piled. The natural flow of materials under gravity depends on the characteristics of the material, such as shape, moisture content, tendency to bind and or stick together, not bind, etc. These characteristics are somewhat unique for each material type and/or blend and can further be influenced by factors such as water or humidity content. The design of the arcuate hopper structure is such that the expected angle that the loose material contained therein is held at is greater than the natural angle of repose for the material, leading the material to naturally flow to the exit or bottom belt. This functionally reduces the amount and extent of vibration required to keep the solids moving in a fluid like fashion to the lower mounted extraction conveyor assembly as the particulate solids contained therein will flow. The angle of repose is not exceeded near the bottom of the bin to function as an intentional bridge for minimizing the weight applied to the conveyor and thus minimizing the wear of friction components while simultaneously reducing the torque requirements of the powering motor. Since vibration is not needed until the majority of the material bulk has been removed, one or more vibrators can be placed strategically rather than generally and the intensity of the vibrations can be delivered to a smaller amount of material compared to the benchmark hoppers.

In one embodiment the mobile aggregate hopper has a longitudinal interior divider wall for holding and isolating at least two types of aggregate, a transverse divider wall for defining at least one wall of a cementitious material bin, and two arcuate longitudinal side walls each formed from a single sheet structure. The mobile aggregate hopper has a base with an integrated aggregate conveyor and means for attachment to a trailer, chassis, or frame having wheels. The single sheet structure arcuate side walls minimize welding and mechanical joints during construction of the hopper, reducing assembly time. The conveyor assembly disposed below the hopper is operable to receive aggregate material from the aggregate bins, and an integrated base encloses the conveyor assembly. The arcuate design of the mobile aggregate hopper provides a stable bin structure to contain aggregate material during loading, transport, and material formulation with a reduced weight structure compared with other designs.

An interior divider wall inside the mobile aggregate hopper is designed to minimize the need for inner support members yet remains sufficiently strong and robust to facilitate one side of the storage hopper to be filled to 100% capacity while the other is filled to 0% capacity. Particularly, the hopper can withstand one side being filled up to 100% while the other side is filled to as little as 0% with no substantial deflection that would compromise the ratio of the isolated bins within the arcuate hopper. The design and geometries of the interior wall are engineered such that the interior wall itself can withstand such a loading scenario with only elastic deformation. Additional included lateral support hopper base brace members are used to restrict and manipulate the elastic deformation of the interior wall such that the segmented bin storage capacities are not substantially altered by the wall movement associated with said elastic deformation. The design of the interior divider, which can be arcuate, is such that it can be caused to vibrate through strategically placed vibrators upon reinforced vibrator pads to bolster the interior wall strength and longevity, typically within the stone compartment. Said vibrators can be energized electrically, hydraulically or pneumatically using minimal external force or power to assist with fluidization and solids material flow from the hopper via the bottom discharge without resulting in undue settling, packing, densification, or other flow hindering condition of the aggregate. The interior divider is designed such that the number of hopper base brace supports are minimized and are located to minimize interference in material flow yet provide structural integrity to the bins across the range of conditions required by the hopper. In addition, the supports are also not likely to impede the ready flow of materials from the hopper through bridging, damming, ratholing, flooding, funnel flow etc.

Within the aggregate hopper can also be contained a bin for the storage of cementitious material or powder. The pair of longitudinal sidewalls together with interior dividing walls in the aggregate hopper can define a plurality of aggregate and not-aggregate material storage bins. Furthermore, the design of the arcuate hopper is such that the end support walls can be utilized as walls of additional hoppers or reservoirs, such as, for example, one or more cementitious material storage hoppers. An interior arcuate divider wall is capable of being engineered for and fitted into bins of a more traditional straight-walled design to achieve similar beneficial results as detailed above. Without being bound by theory, it is observed that the overall center of mass of the described empty and loaded arcuate hopper is lower and more central than existing solutions with solid straight-walled hoppers. This provides additional stability during loading, transport, and use, improving safety. Another advantage of the presently described aggregate hopper design relates to ease of manufacturing through the minimization of weld joints, reduced requirement for support braces, and the ability to use robotic automation for the welding of long straight seams. Furthermore the value of this design is compounded when working with high strength modern engineered materials that have superior abrasion and structural properties.

FIG. 1 is a side perspective view of an arcuate aggregate hopper 2 with interior divider wall 6. First and second side exterior arcuate longitudinal side walls 4a, 4b are connected at one end to the hopper front wall 8 to define a storage bin together with a rear wall (not shown). In the embodiment shown, interior divider wall 6 extends from hopper front wall 8 defining two reservoirs, shown as sand reservoir 22 and stone reservoir 24. Interior divider wall 6 can be arcuate, with one or more bend or arc, or can be flat or planar with no curve or bend. Each longitudinal side wall extends downward to define an integrated base 34 wall which houses the discharge conveyor 32. Each longitudinal side wall extends downward to define an integrated base 34 wall which houses the discharge conveyor 32. The hopper base braces 20 are engineered such that the interior arcuate divider wall 6 can deflect to a limited extent however remains free to vibrate.

The arcuate hopper longitudinal walls 4a, 4b, and optionally interior divider wall 6, can be developed or constructed through rolling or by roll approximation through "step bending" or "bump bending" or the accumulation of multiple open and close proximity bends at one or more open bend angles x, or a combination thereof. The bends can be of varying degrees and spacing based on the size of the arcuate hopper, desired shape of the arc in the arcuate wall, and location of the bend on the hopper wall arc. The multiple open and close proximity bends can be set in a specific proximity to one another to manipulate the solid material flow characteristics of materials as they are discharged through the bottom. The hopper front wall 8 can also be bent to reduce the volume of the hopper, facilitate a reduced size lower discharge conveyor, and or manipulate the interface with the arcuate interior divider wall 6. Arcuate support brace 18 is preferably integrated with the hopper front wall 8 and provides strength and rigidity to the entire hopper. The arcuate hopper can further comprise one or more arcuate support braces 18 which can be mounted on the inside or outside walls of the side arcuate hopper longitudinal side walls 4a, 4b to support the longitudinal side walls. Arcuate support braces 18 can be positioned adjacent the hopper front wall 8, hopper rear wall, or at various locations along the exterior of the hopper 2 along the arcuate hopper longitudinal side walls 4a, 4b. The arcuate support brace 18 has an arc matching the arc of the arcuate longitudinal side walls 4a, 4b.

Step bending can be accomplished with varying bend intensities and bend lines of varying proximity to each other depending on the desired arc of the walls. These corrugation characteristics are used to maximize rigidity above what would be possible with a smooth sheet of base material metal while being mindful to the solids flow and fluidization characteristics of aggregate materials stored in and being discharged from the completed arcuate hopper assembly. Furthermore, the bend lines and geometries are such that the number of welds required to complete the assembly are minimized to preserve the characteristics of the engineered steel substrate. The arcuate side walls 4a, 4b can be manufactured from an abrasion, dent resistant formulation. Preferable materials for the arcuate support brace 18 include but are not limited to engineered materials with very high yield strengths to allow maximum performance with minimal member thickness to reduce weight without sacrificing performance. The geometries of the side walls 4a, 4b have also been found to be suitable even with traditional straight-walled designs.

Hopper base braces 20 maintain the strength and stability of the lower part of the arcuate hopper and structurally connect the pair of longitudinal side walls 4a, 4b and the interior divider wall 6. The hopper base braces 20 can comprise or consist of members or pretensioned members that are capable of resisting separating movement of the arcuate longitudinal side walls 4a, 4b while positioning the interior wall 6 with respect to the longitudinal side walls 4a, 4b and maintaining the inner hopper proportions through the use of a spacer such as a pipe or bar to cover the member or pretensioned member. Said spacer pipe can be made from materials with different properties such as increased abrasion resistance that also protect the stressed hopper base braces from damages due to prolonged exposure to aggregates. The lower mounted hopper base braces 20 are capable of holding the bottom of interior divider wall 6 in place within tolerance even in conditions of unequal loading between the sand and stone reservoirs 22, 24, strengthening interior divider wall 6. The hopper base braces 20 are engineered such that their shape, geometries, size, position relative to each other, etc will not impede material discharge from the arcuate storage hopper 2 onto the lower mounted discharge conveyor 32.

Arcuate hopper longitudinal side walls 4a, 4b are secured below the functional hopper region to support and encase the lower mounted conveyor 26 such that the hopper can rest directly on the chassis or a subframe. Such a design with an integral lower mounted conveyor can lower the center of mass and eliminate the need for mounting provisions and fasteners typically required by designs featuring separate discharge conveyors. The combination of all these structural features working together provides a structure that is stronger and more rigid than any member individually and is capable of withstanding the varying loads that can be applied if the entire arcuate hopper assembly was mounted to a vehicle and subjected to the stresses, deflection of driving around round-about road works at relatively high speed, under a variety of different load conditions.

Figure 2:
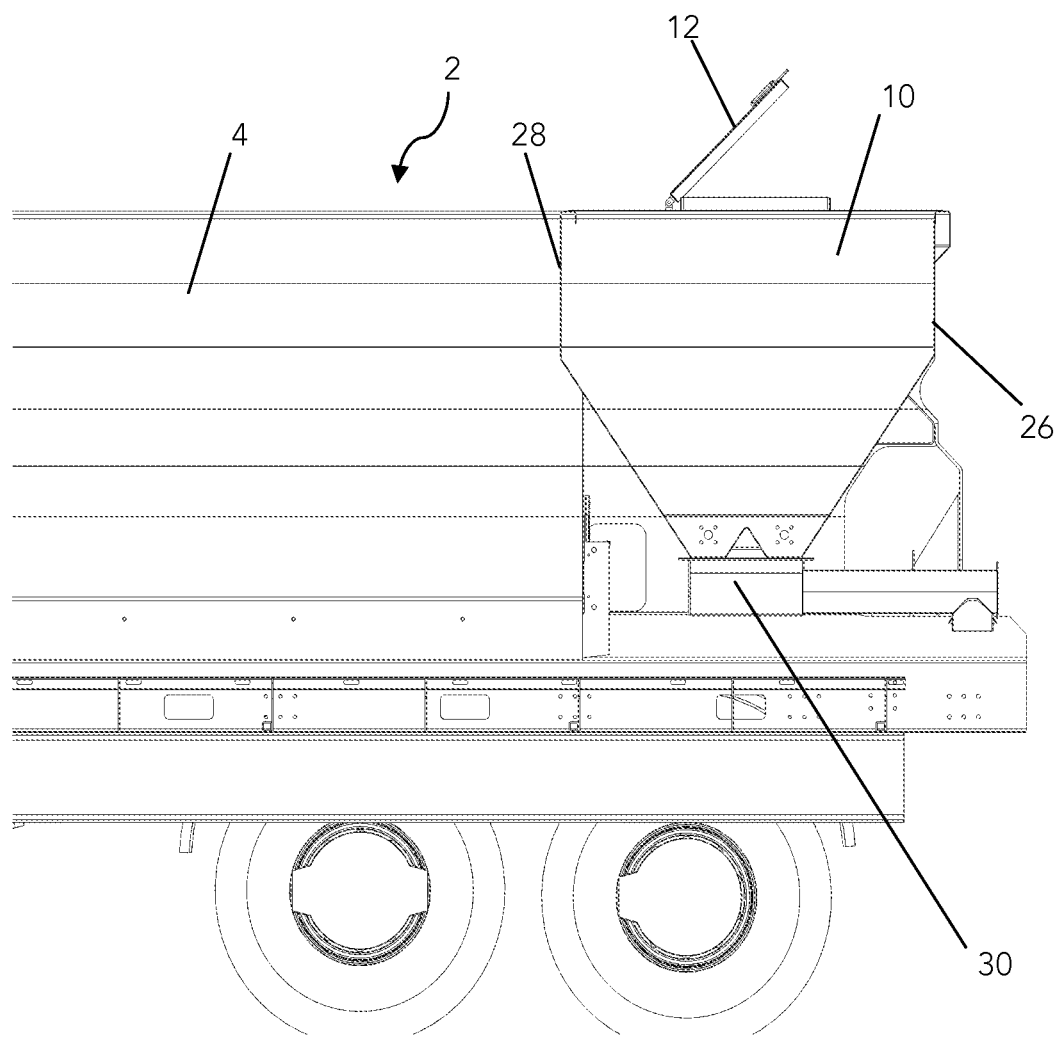
FIG. 2 is a side view of a mobile volumetric mixer with an arcuate aggregate hopper with integrated cementitious material hopper.

FIG. 2 is a side view of a mobile volumetric mixer with an arcuate aggregate hopper 2 with integrated cementitious material reservoir 10. The cementitious material reservoir 10 can have a dedicated or shared lateral interior divider wall 28 with the arcuate aggregate hopper 2. Having this type of structure with the cementitious material reservoir 10 integrated with other aggregate storage reservoirs and the arcuate longitudinal side walls saves on materials, decreases the overall mass of the hopper, while also strengthening the reservoirs as well as the hopper as a whole. The lateral interior divider wall 28 of the arcuate hopper 2 can be planar, or may also be arcuate or bent, optionally of a stepped design. An interior angled or arcuate design provides improved solid materials flow both when fluidized and not fluidized as previously described. The curved or bent structure of the lateral interior divider wall 28 can also accommodate other mechanisms such as solids flow control valves. The cementitious material reservoir 10 shown is defined by the arcuate longitudinal side walls of the hopper, the lateral interior divider wall 28, and the hopper rear wall 26 which can also be planar, bent, or arcuate. The integration of this wall structure connects the interior and exterior walls in a high strength manner without the need of excessive reinforcements. The cementitious material reservoir 10 is preferably covered to prevent contamination and undue humidity. Hatch 12 can be located on the top of the cementitious material reservoir 10 and is capable of creating a substantially water tight seal to shelter cementitious materials from premature hydration. The cementitious material reservoir 10 can also utilize the exterior arcuate longitudinal side walls 4 as false walls in some or all regions while employing other walls as true bin boundaries to direct materials to the material discharge augers 30. The voids created by the false walls can be used to obscure support items such as but not limited to bearings, hoses, wires, motors, ad mix tanks, solid flow gates, etc. The continuation of the exterior arcuate walls incorporating and beyond the cementitious material reservoir 10 can also be beneficial in terms of overall aerodynamics of the volumetric mixer, which is particularly applicable to chassis and or trailer mounted mobile applications of volumetric mixer.

Figure 3:
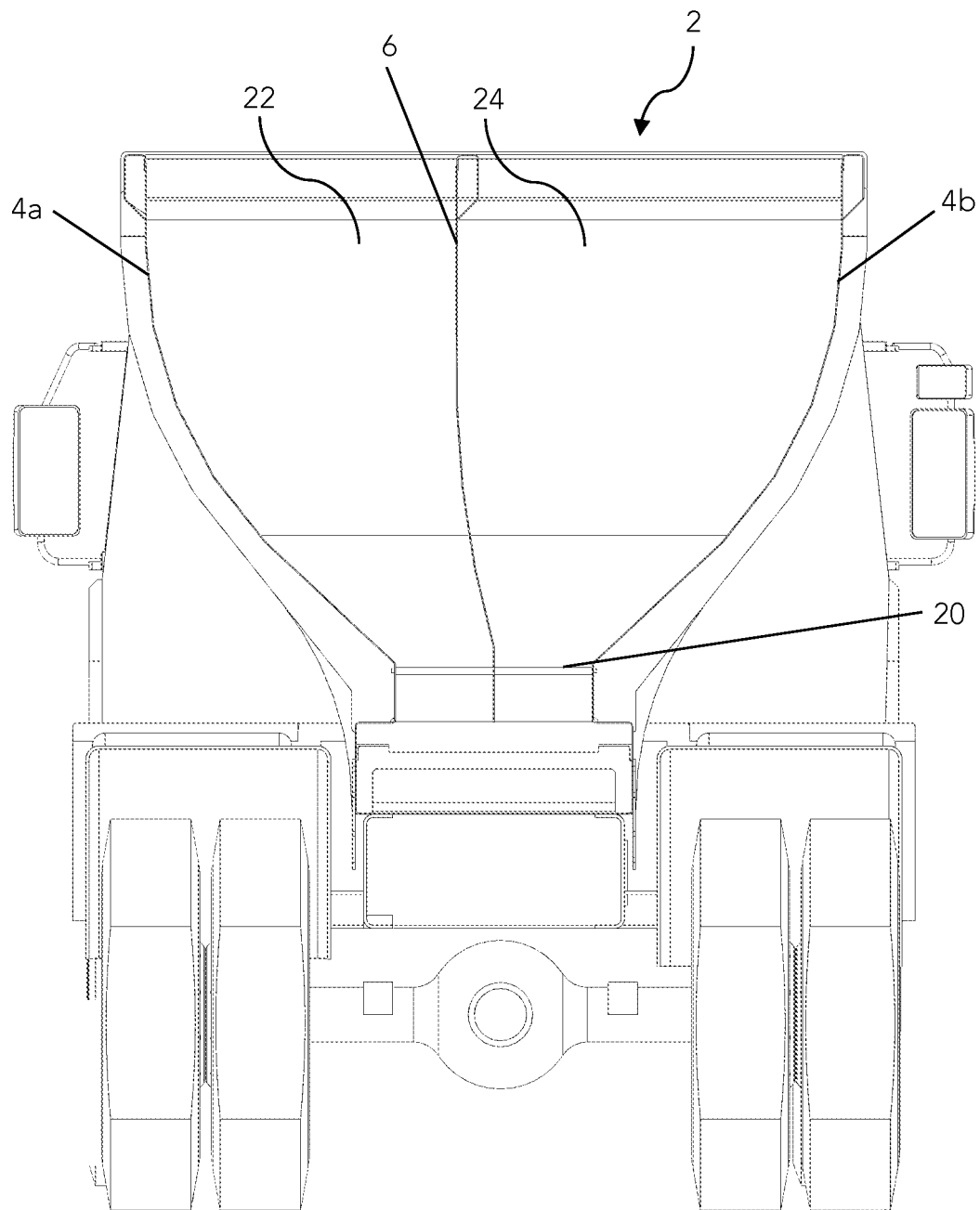
FIG. 3 is a rear cross-sectional view of a mobile volumetric mixer with an arcuate aggregate hopper and arcuate interior divider wall.

FIG. 3 is a rear cross-sectional view of a mobile volumetric mixer with an arcuate aggregate hopper 2 and arcuate interior divider wall 6 as mounted to a vehicular frame or chassis. The arrangement between the arcuate longitudinal side walls 4a, 4b and the arcuate interior divider wall 6 can be such that the volumes of the subdivided hopper are not equal. In one case the sand reservoir 22 portion of the arcuate hopper 2 is smaller than the stone reservoir 24 portion due to the location and geometries of the arcuate interior divider wall 6. In addition, the top and bottom position of the arcuate interior divider wall 6 are not necessarily in the same location relative to the centerline of the entire mixer and volumes of the interior reservoirs. The hopper base braces 20 can be calibrated with non-symmetrical spacer lengths to manipulate said centerline asymmetry. The overall design and function of the arcuate hopper provides a lower center of mass of the hopper both when filled and empty, while increasing the solids material flow ability which is especially useful in a truck chassis and trailer mounted applications.

Figure 4:
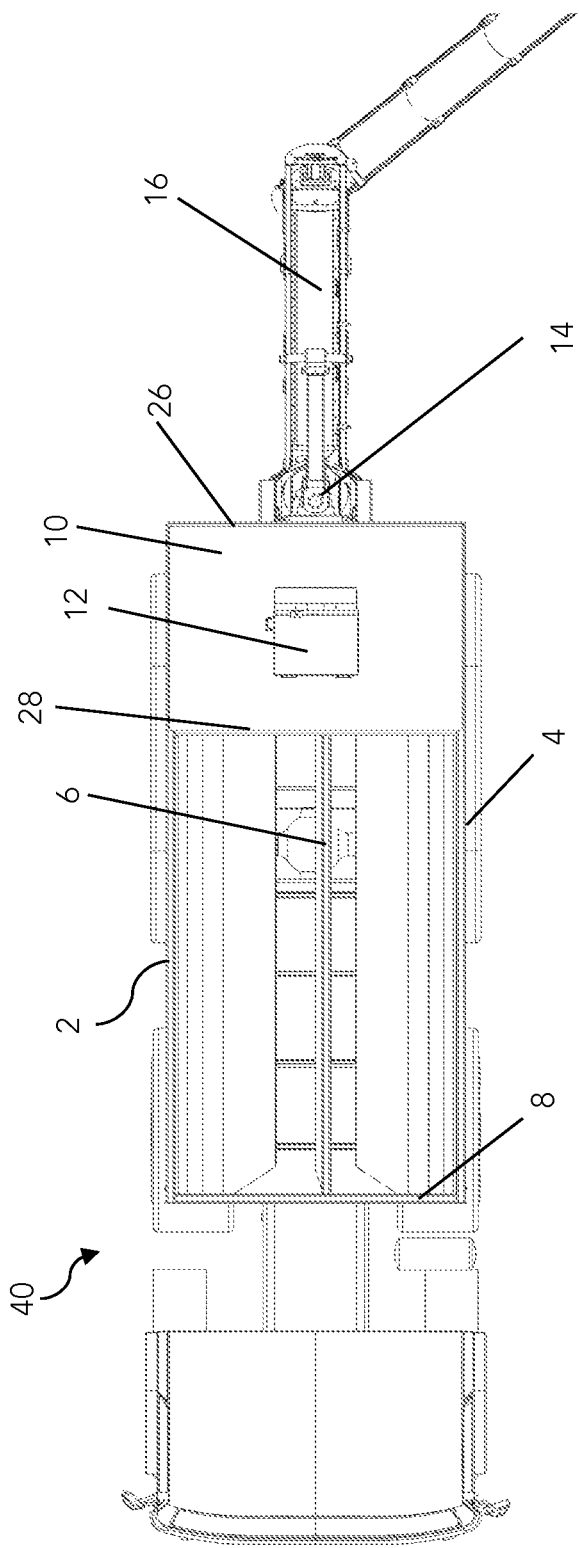
FIG. 4 is a top view of a mobile volumetric mixer with an arcuate aggregate hopper.

FIG. 4 is a top view of a mobile volumetric mixer 40 with an arcuate aggregate hopper 2. The arcuate aggregate hopper 2 is mounted onto a generic truck chassis to comprise a volumetric mixer truck body. Volumetric mixers generally consist of reservoirs of base materials including at least one water storage tank, a sand storage bin, an aggregate storage reservoir, and at least one cementitious powder or cementitious material storage reservoir. Other storage reservoirs or liquid admixture reservoirs can hold liquid materials such as, for example, binders, colorants, and other additives. In one example, retarders and fly ash can be added to slow the hydration process. Examples of admixtures include but are not limited to colourants, retardants, air entrainment compounds (to increase freeze-thaw durability), water reducers (to achieve different slumps at a lower cement ratio than what is normally designed or increase concrete strength by using less cement), accelerants (to reduce setting time and/or increase the rate of strength development), shrinkage reducers, and liquid additives like latex and superplasticizers. Storage reservoirs are typically located between the chassis cab and hopper front wall 8, however can also be arranged such that they are inside and/or not protrude past the top of the arcuate longitudinal side walls 4. Hatch 12 on the covered cementitious material reservoir 10 is designed to prevent hydration of cementitious materials before delivery to the mixing auger 16. Individual base materials are directed from their individual reservoirs to a mixing funnel 14 which feeds a mixing auger 16 (inside housing). Cementitious materials are delivered from the integrated cementitious material hopper 10 via screw conveyors into the mixing funnel 14 then into the mixing auger 16. Solid base materials can include aggregates such as but not limited to sand, gravel, and stone, and fibers including but not limited to steel, glass, synthetic, natural, polymeric, and combinations thereof. These aggregates are isolated from each other by the arcuate interior divider wall 6 which can be positioned to facilitate unequal amounts of multiple aggregates. The multiple aggregates are separated from the cementitious materials by a lateral interior divider wall 28. Manipulation of the amount of each individual ingredient as it is dosed into the mixing auger 16 and control of mass or volume of each added material is supplied and controlled by a gate, pump, auger, conveyor, plunger or other flow control device through the mixer control system. The mixing auger 16 receives the individual materials, then mixes and dispenses the mixture such that the dispensed material is uniform, preferably without entrapped air and adequately wetted and/or partially hydrated, by the time the material leaves the auger. The hopper front wall 8 and hopper rear wall 26 may or may not be of arcuate design. The front and back end of the arcuate hopper can also optionally be shared with neighbouring hoppers.

Figure 5:
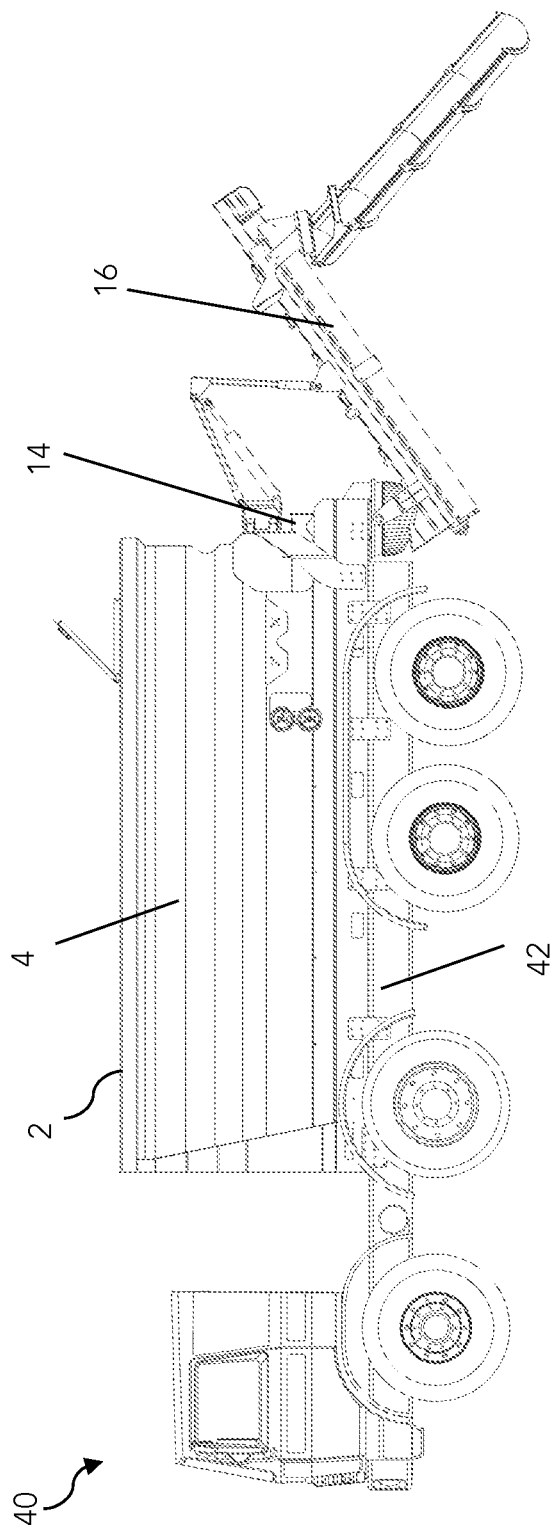
FIG. 5 is a side view of a mobile volumetric mixer with an arcuate aggregate hopper.

FIG. 5 is a side view of a mobile volumetric mixer 40 with an arcuate aggregate hopper 2 mounted to a generic truck chassis 42. Hopper longitudinal side wall 4 can extend beyond the storage reservoirs to assist with factors such as aerodynamics and increased cover of exposed material on the bottom mounted conveyor. The hopper longitudinal side wall 4 can extend past the back wall of the aggregate hopper 2 and/or the cementitious product storage bin walls to near the mixing funnel 14. The hopper front wall shown is formed of a 2-step design of improved interface with an arcuate interior divider wall. The center of mass for this mobile unit has been shifted forward and in front of the centermost rear axle in conjunction with the arcuate hopper design. This shift of the center of mass results in improved vehicle handling, more uniform axel loading and weight distribution, and increased ability to traverse angled or uneven off road environments. The mixing auger 16 is shown in its extended working position. The cementitious material reservoir hatch 12 is shown partially open and ready to receive cementitious materials into the integrated cementitious material reservoir. Here the longitudinal side wall 4 covers and hides the shared bin dividing wall(s), enclosing and protecting other reservoirs as well as conduits, hoses, tubes, valve, wires, vibrators, pumps, and other components.

Figure 6:
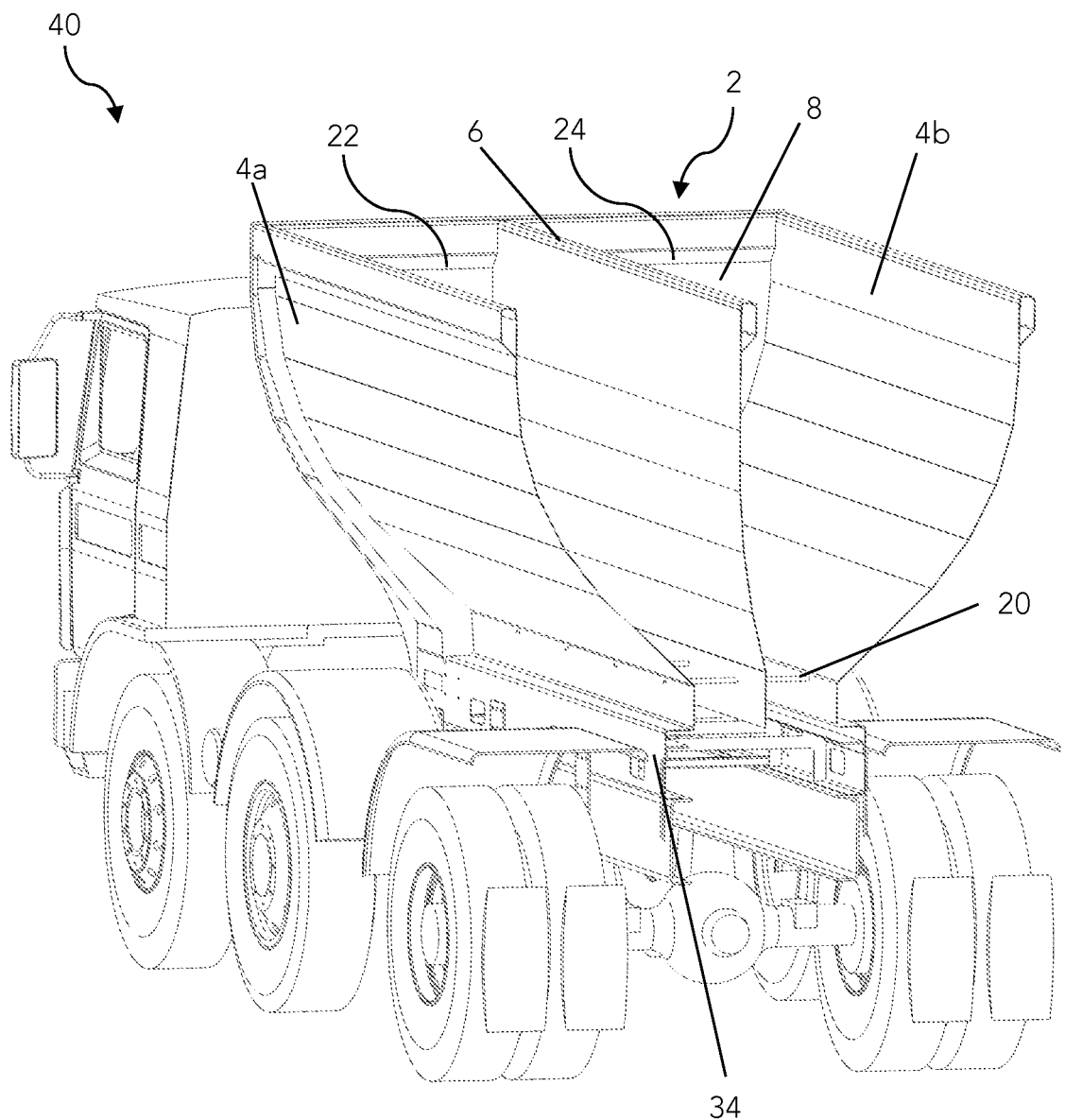
FIG. 6 is a rear perspective cross-sectional view of a mobile volumetric mixer with an arcuate aggregate hopper.

FIG. 6 is a rear perspective cross-sectional view of a chassis mounted mobile volumetric mixer 40 with an arcuate aggregate hopper 2. The arcuate aggregate hopper 2 is mounted to the chassis of a truck to facilitate transportation to and from job sites. The arcuate longitudinal side walls 4a, 4b are designed such that the weight and load of sand and stone in their respective reservoirs 22, 24 will lower the centre of mass of the reservoirs, thus discouraging vehicle toppling even in aggressive cornering maneuvers. The hopper base braces 20 extend clear through the exterior longitudinal side walls 4a, 4b and can be used to maintain the distance between the longitudinal side walls 4a, 4b and the interior dividing wall 6 which is also helpful during cornering maneuvers. The hopper base braces can simultaneously function as a spacer and tie brace as previously described. The interior divider wall 6, hopper front wall 8 and hopper base braces 20 all work together in conjunction to prevent the movement of the interior divider wall 6 even during cornering maneuvers especially when the sand and stone reservoirs 22, 24 are not symmetrically loaded. Integrated base 34 comprises brackets and supports the aggregate conveyor such that the aggregate hopper is of a singular construction with the aggregate conveyor. This provides additional structural support to the aggregate hopper.

Figure 7:
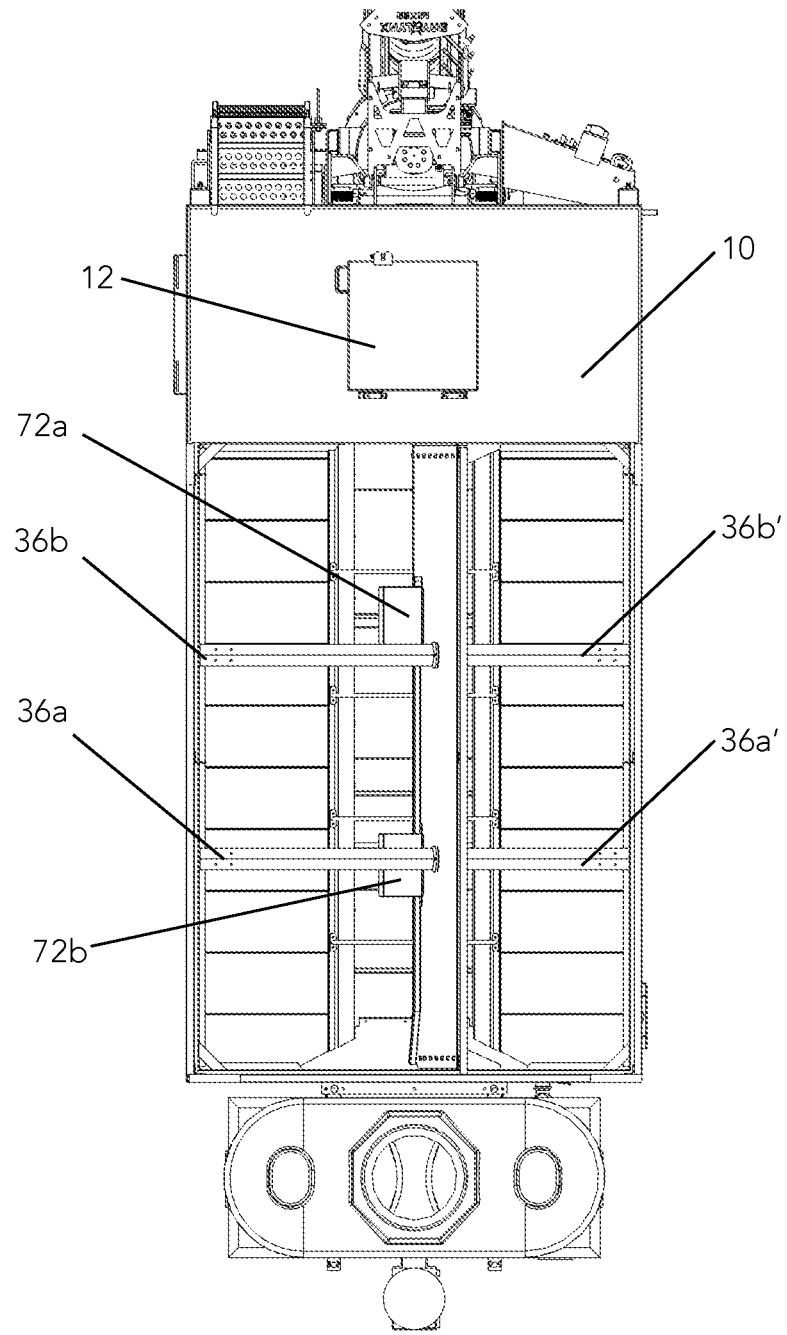
FIG. 7 is a top view of a hopper with a cementitious aggregate bin with a lid.

FIG. 7 is a top view of a hopper with a cementitious aggregate bin with a lid and vibrators 72a, 72b. Interior sidewall is supported by way of pairs of support braces 36a, 36a' and 36b, 36b' which stabilize the interior sidewall relative to the longitudinal hopper sidewalls. Cementitious material reservoir 10 has hatch 12 for loading, with a roof or cover for protecting the cementitious material from exposure to moisture.

Figure 8:
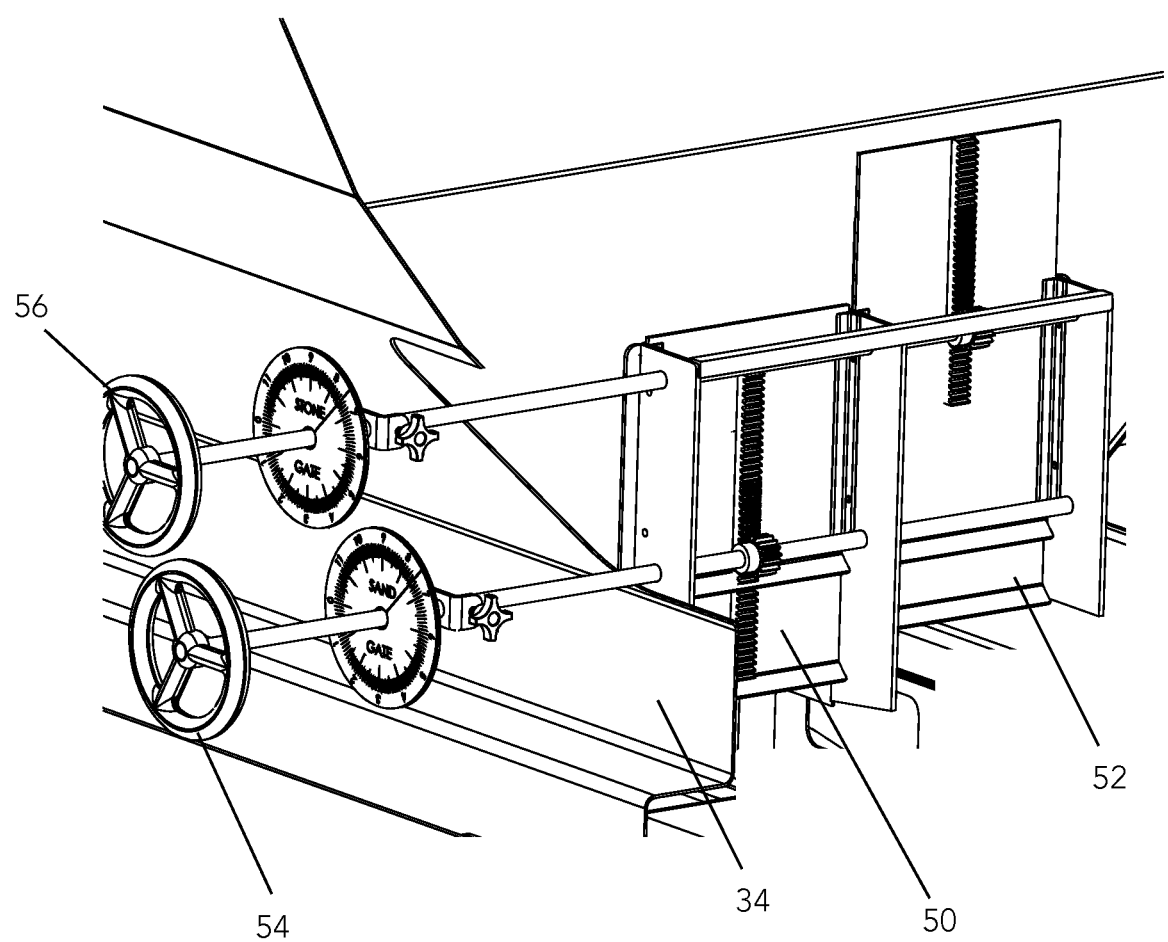
FIG. 8 is a rear perspective cross-sectional view of an arcuate aggregate hopper with metering gates.

FIG. 8 is a rear perspective cross-sectional view of an arcuate aggregate hopper with aggregate metering gates mounted to the rear wall of the sand reservoir and stone reservoir. Shown are two metering gates, one for each hopper. The sand metering gate 50 and the stone metering gate 52 function as solids flow valves capable of independent movement between 0% open to 100% open through use of the sand metering gate control 54 and stone metering gate control 56. It is possible to have the sand gate 50 set to 0% open while the stone gate 52 is set to 100% open through manipulation of the sand metering gate control 54 and stone metering gate control 56. Any combination degree of openness of these valves is possible. Shown are manually controlled metering gates, however the metering gates are also capable of one or more of electrical, electronic, and hydraulic position control. The sand metering gate control 54 and stone metering gate control 56 can penetrate the arcuate longitudinal side walls to facilitate easy manual adjustment. In the configuration shown, the sand metering gate 50 and the stone metering gate 52 are concealed in the void created by a false lateral rear wall of the sand and stone reservoir and the integrated cementitious material hopper, which is the void between the outside wall and the angled bottom for the cement bin. The solids flow metering gates each have controllable height adjustment capability. The flow gates are calibrated and used to volumetrically control the flow rate of sand and gravel (aggregate) type solids as they are dosed into the mixing screw conveyor (auger). The sand metering gate 50 and the stone metering gate 52 are controlled here by flow control hydraulic or pneumatic cylinders (not shown). A lower mounted transfer belt conveyor is typically used to control the flow of the primary solids to the mixing region of the system. The solids flow gates can also be set to an infinitely adjustable position through the use of a linear actuator, such as an electro mechanical, hydraulic, or pneumatic actuator, optionally in conjunction with a position sensor. FIG. 8 shows one gate more open than the other showing the capability of individually controllable solids flow rates with a uniform lower mounted conveyor belt speed. A square-strike-off system for the sand and stone flow gates can further provide an accurately calibrated amount of material to the composition. Square strike off is defined as the shape of the aggregates on the feed conveyor as they leave the storage hopper and head toward the collecting funnel. The width of the flow gates is set, however the height of the gate is variable. The bottom geometry of the solids flow gates is preferably angled to compress the materials against the lower conveyor to simultaneously remove entrapped air while also creating a uniform rectangular shape of known volume as is required by a continuous volumetric mixer. The lower conveyor is flat and smooth and the lower gate geometry is known, and is preferably square with 90 degree corners such that the aggregate material that flows from the storage hopper is of a readily calculated volume and has been "square struck off". The square strike off on top of the compressed material flow makes the cross sectional area shape of the aggregates moving from the storage hopper on the feed conveyor very regular and rectangular for simplified volumetric calculations. The regular and rectangular flow of materials has a secondary benefit of making a blockage or partial blockage of the gate very obvious. In one example, if a large rock has blocked the sand gate opening the operator will see an irregular shape of material flowing in to the mixing auger rather than the expected square shape, thus signalling a fault that will affect mix design.

Figure 9:
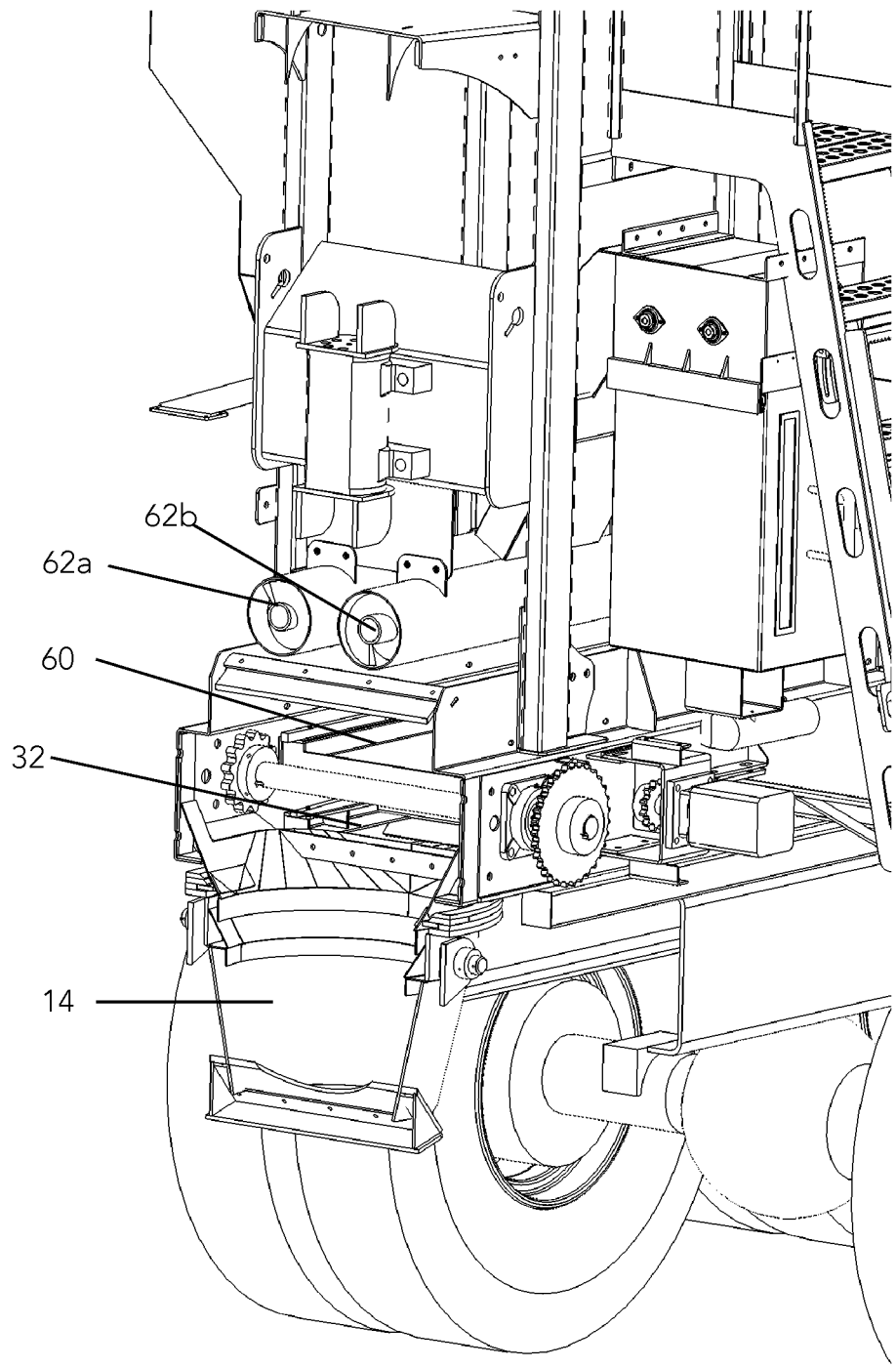
FIG. 9 is a cutaway view of the drop point of materials discharge from the hopper into the mixing bowl or funnel before entering the mixing auger.

FIG. 9 is a cutaway view of the drop point of all the materials into the mixing funnel 14 before entering a mixing auger as mounted to a vehicle chassis. The powered cementitious material reservoir transfer augers 62a, 62b controls the flow rate of cementitious powder into the concrete mix design. Geared transfer augers 62a and 62b are screw conveyors that control the flow and delivery of cementitious material from a cementitious material storage reservoir to standardize the volume or mass of cementitious material going into the concrete mix design. Cement or powder metering can further be mechanically linked to the transfer conveyor 60 of the lower mounted discharge conveyor 32 or auger delivering sand and stone, meaning that the most costly ingredient (cementitious powder) will be ratioed precisely and accurately. Addition of cementitious powders can also be independently powered via a secondary motor or engine. The sand, stone, and cementitious materials are all conveyed and deposited into mixing funnel 14 via transfer conveyor 60 which feeds the mixed material into the mixing auger. Multiple powder additives such as Portland cement and supplementary cementitious materials (SCMs) can also be added and multiple bin and transfer devices can be controlled to mount multiple, independently powered powder silos. Powder additives in addition to Portland cement and fly ash include but are not limited to powder colourants, powders for added texture modifiers, powders for aesthetic applications, and other powders. Other flow control devices that can be used to meter solid powders include but are not limited to chain drives and transfer conveyors or belts. The dosing of these powders is preferably conducted by a series of screw conveyors or augers located at the bottom of storage bins. The dosing screw conveyors or geared transfer augers 62a and 62b can each be individually powered, such as hydraulically, electrically, or pneumatically, and can be controllable with individual electronic control units through communication, with each of the two motors independent from each other and operational at different speeds from 0% to 100%. This can control the dosing of, for example, 0 to 30 kg/second of each of the powders into the chemical mix design. In one preferable example, individual hydraulic motors are controlled by an electrically actuated hydraulic flow circuit capable of dynamically varying the motors speed and torque. One or more optional vibrators on the aggregate and/or cementitious material storage compartments can assist with homogenizing or fluidizing the contents of the bin or breaking up clumps of material to improve material flow. Shown is a cutaway view of the drop point of all the materials into the mixing funnel 14, before going into the mixing auger where the mix speed and fall back rate can be dynamically controlled.

An independently powered drive motor can be used for drawing sand and or gravel type aggregates from the aggregate hopper compartments. One or more transfer conveyors can also be used to draw aggregate from the hopper compartments to the mixing funnel. Transfer conveyor 60 that feeds aggregate from the aggregate bins can be, for example, belt and or screw style. Although a single transfer conveyor 60 is shown, the hopper bottom may be integrated with more than one transfer conveyor, and may have a dedicated transfer conveyor for the bottom of each compartment in the hopper. Each conveyor can be independent from one another and can operate at different speeds from 0% to 100%. This can control the dosing of, for example, 0 to 90 kg/second or more of each of the aggregate type ingredients. The transfer conveyors can be used to deliver secondary and tertiary type ingredients as well. Transfer augers 62a and 62b discharge cementitious material from the cementitious material compartment into mixing funnel 14 for mixing before all fed materials enter the mixing auger. The motor, or any motor in the volumetric mixer can, for example, be a direct drive, gear box or gear/sprocket drive design, or any power transmission device desired depending on design torque requirements.

Figure 10:
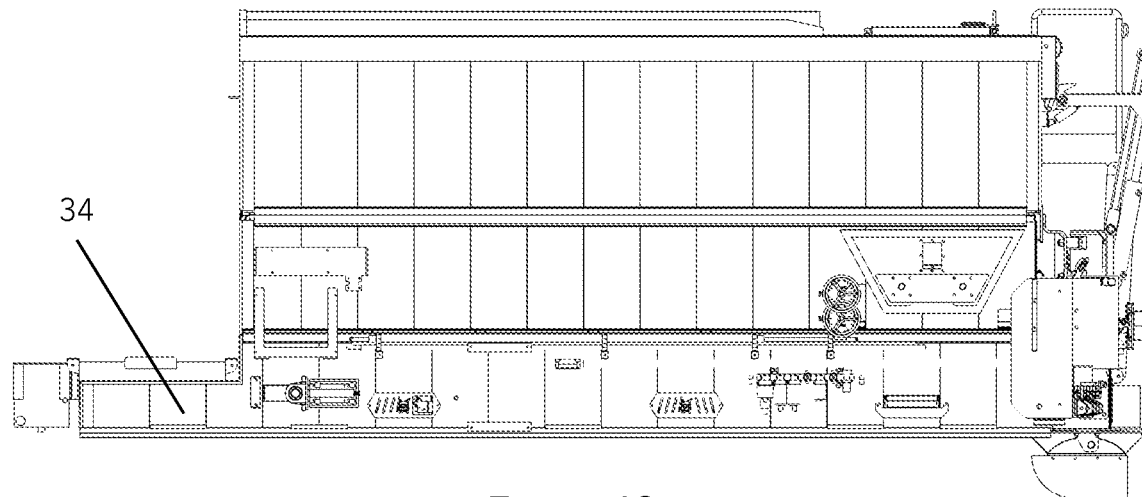
FIG. 10 is a side view of a paneled wall aggregate hopper.

FIG. 10 is a side view of a mobile aggregate hopper made from double walled aluminum panels. The panels shown are connected together to provide a strong yet lower weight hopper that is capable of withstanding the pressures and masses required to hold, transport, and mix aggregate. Both the aluminum paneled design and the arcuate design described provide a significant weight reduction compared to standard steel construction while maintaining the required structural integrity. The percentage difference of both the arcuate aggregate hopper machine and the aluminum paneled hopper with angled side walls is estimated to be between 35 and 40% lighter than a comparable all-steel constructed unit.

Figure 11:
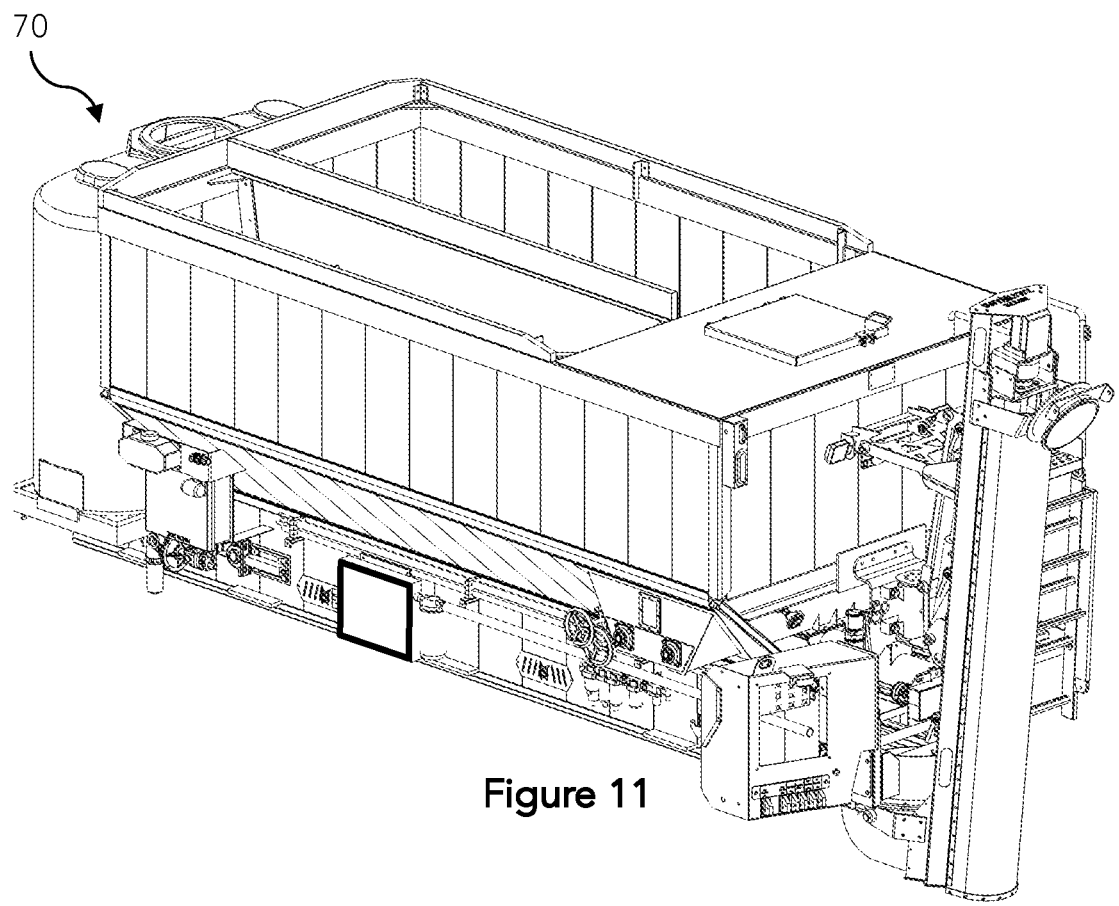
FIG. 11 is a side perspective view of a paneled wall aggregate hopper.
Figure 12:
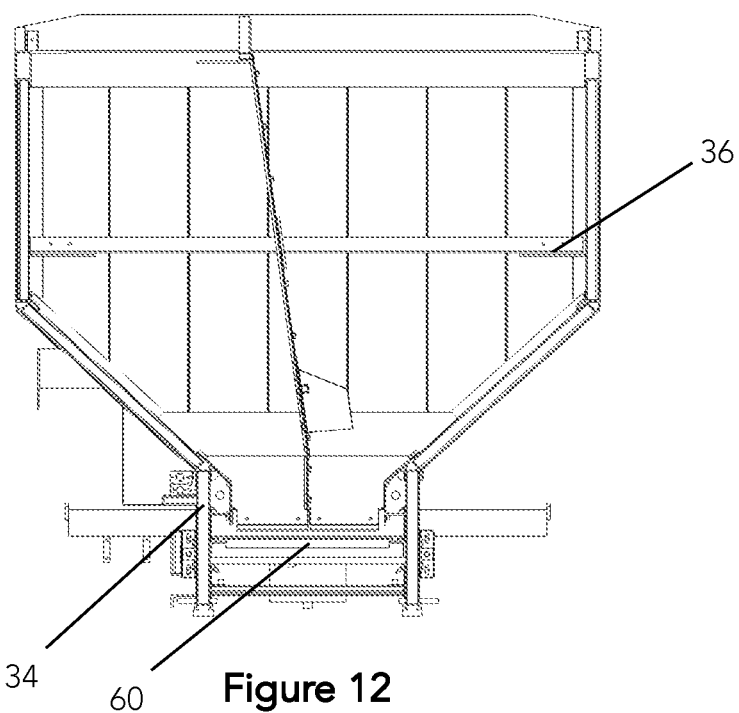
FIG. 12 is a cross-sectional view of a mobile aggregate hopper of a panel design.

FIG. 11 is a side perspective view of a paneled wall aggregate hopper 70. The inside of the aluminum panels are visible. New laws for vehicle weights in Europe in particular dictate that all volumetric concrete mixers must adhere to the AUW ("all-up weight") laws of a maximum gross vehicle weight rating (GVWR) of 32,000 kg. Prior to the new laws, during the transition period, the maximum allowable weight for a volumetric vehicle is 38,400 kg, and older laws had a maximum gross weight limit of 44,000 kg. Vehicles with light weight, high strength hoppers of the presently described design are capable of staying within the new AUW weight limits while providing a high capacity volumetric mixer with reliable strength and durability FIG. 12 is a cross-sectional view through a mobile aggregate hopper of an aluminum panel design showing integrated base 34, support brace 36, and transfer conveyor 60.

Figure 13:
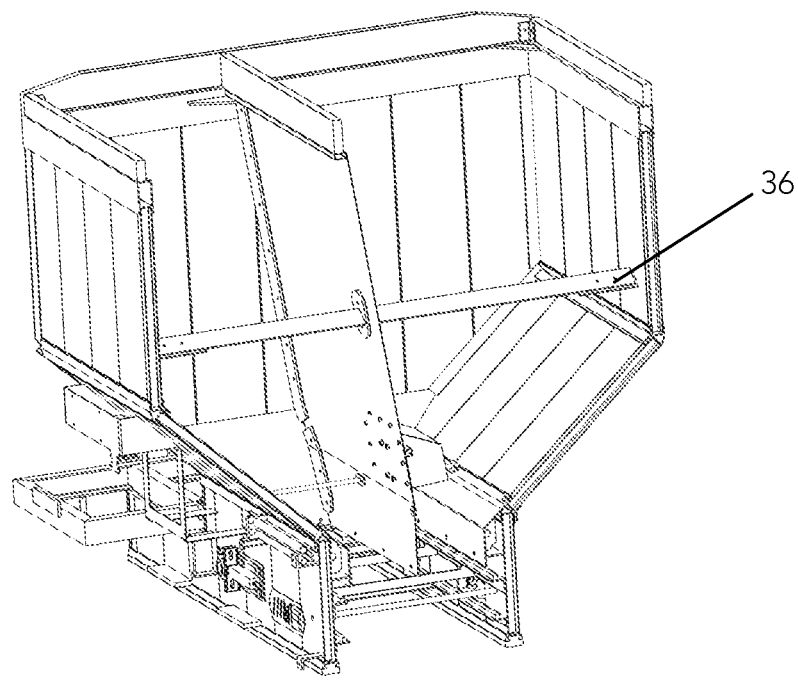
FIG. 13 is a perspective cross-sectional view of a paneled mobile aggregate hopper showing the support braces.

FIG. 13 is a perspective cross-sectional view through a mobile aggregate hopper showing the support brace 36 in an aluminum panel design.

Figure 14A:
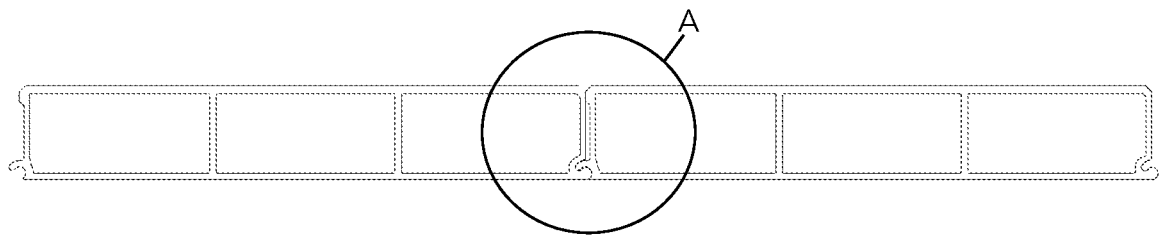
FIG. 14A is a cross sectional view of an example panel joinery for an aluminum paneled hopper.
Figure 14B:
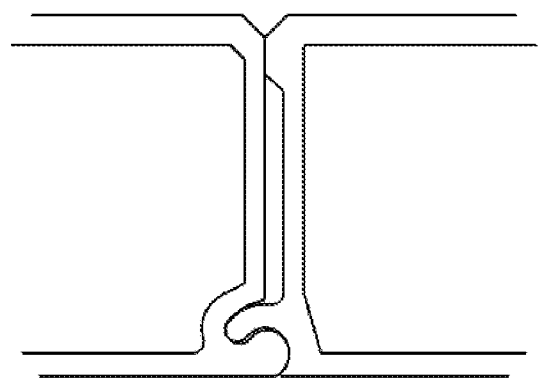
FIG. 14B is a close up of the panel joinery shown in FIG. 14A.

FIG. 14A is a cross sectional view of an example panel joinery for an aluminum paneled hopper, and FIG. 14B is a close up of the panel joinery from 'A' shown in FIG. 14A.

Figure 15A:
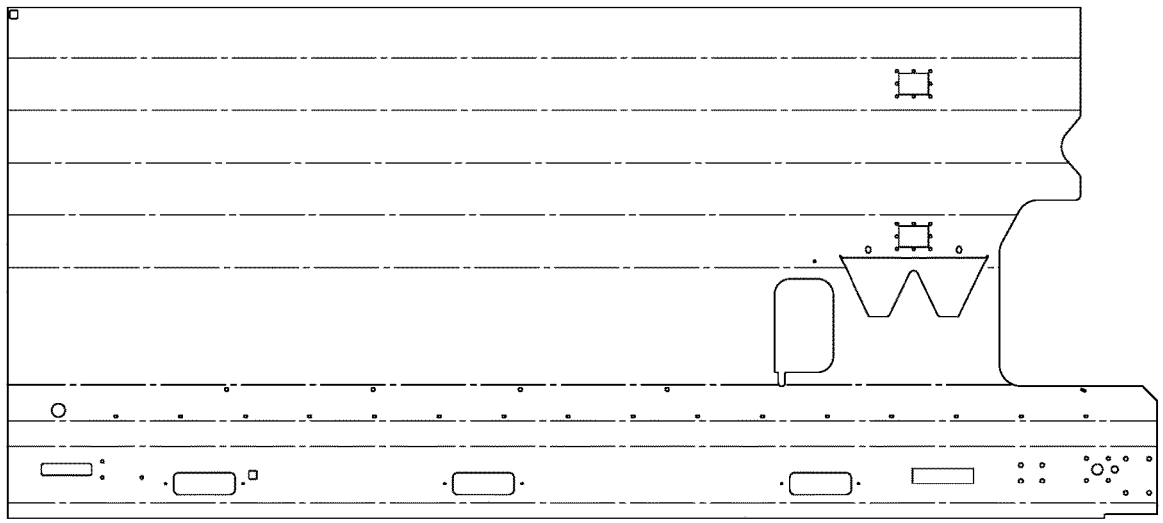
FIG. 15A is an side view of an arcuate wall blank cut before forming.

FIG. 15A is an side view of an arcuate wall blank cut of a hopper longitudinal side wall before bending and forming. The single continuous sheet provides the structure for the arcuate longitudinal side wall as well as the base of the hopper which houses the conveyor assembly. The blank is typically laser cut from a single large sheet and is designed with geometries to have minimal heat affected zones, deformation during cutting, forming and final welding. The single large sheet is preferably a sheet of high performance steel which has bending and strength properties to retain the arcuate shape of the walls after bending with less overall weight. The blank shown is bent and formed to create a single continuous side wall for the hopper in which the arcuate longitudinal side wall and integrated base of the hopper are formed from a single sheet.

Figure 15B:
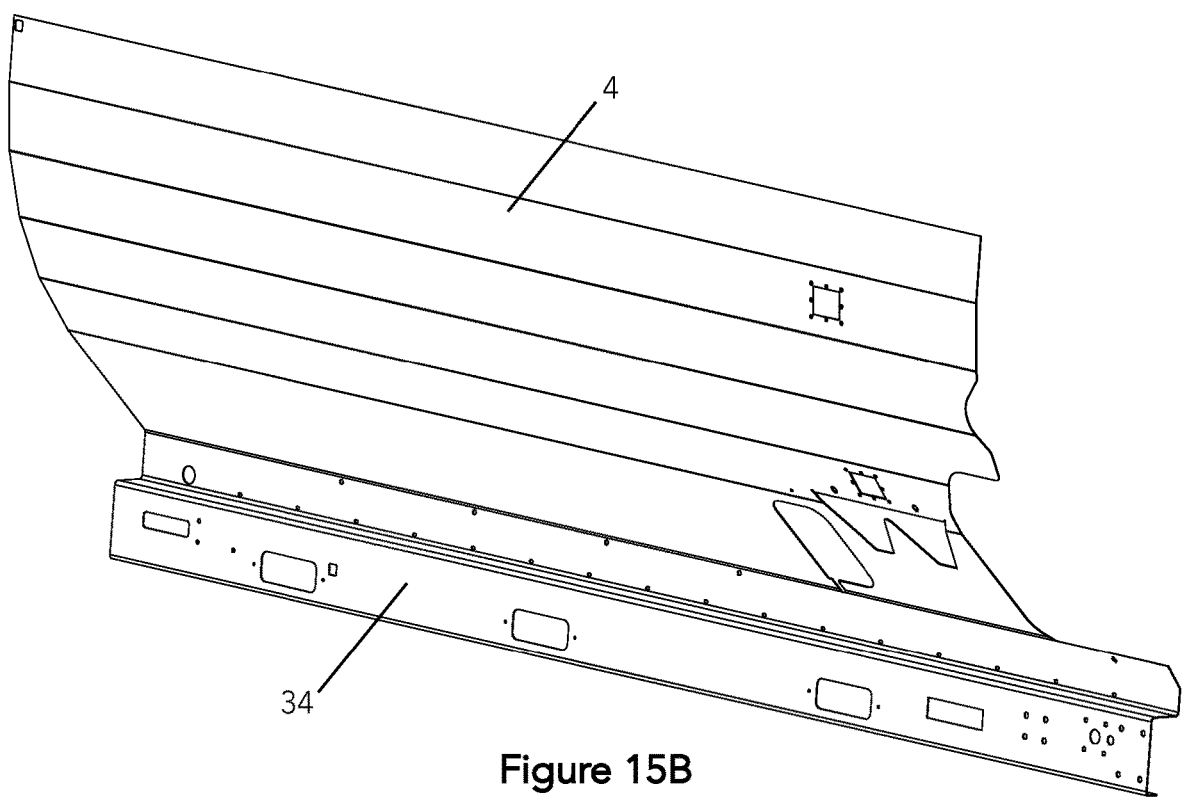
FIG. 15B is an isometric view of the arcuate wall from FIG. 15A after rolling and bending.

FIG. 15B is an isometric view of the arcuate wall from FIG. 15A after rolling and bending. The conveyor support structure and substantially all mounting holes have been cut and engineered into the arcuate wall blank cut. The engineered position of all cuts and orifices such that areas affected by bending and/or forming deformation are substantially clear from critical and or precision areas. Bending radii allowances and material stretch and or shrinkage is factored into the design. Once the blank sheet is bent and formed according to the bend design, the arcuate longitudinal side wall 4 is defined as well as the integrated base 34, where the side wall and base are defined by the same continuous single material sheet, preferably a sheet of steel. The integrated base 34 houses the conveyor assembly with transfer conveyor together with the integrated base of the other longitudinal side wall when the hopper is assembled. The integrated base 34 houses and protects the conveyor assembly and enables the hopper and conveyor assembly to be manufactured as a single construction for simplified and more reliable transport of the hopper as well as ease of assembly of the volumetric mixer vehicle. The integrated base 34 also protects the mechanical parts of the conveyor assembly from outside dirt and humidity, and provides a stable and protective compartment for the conveyor assembly. The stability offered by the integrated base 34 is especially advantageous during movement of a vehicle with the hopper, where less joinery and fewer pieces provide a more stable overall structure that is less prone to misalignment, movement, and joint failure.

Figure 16:
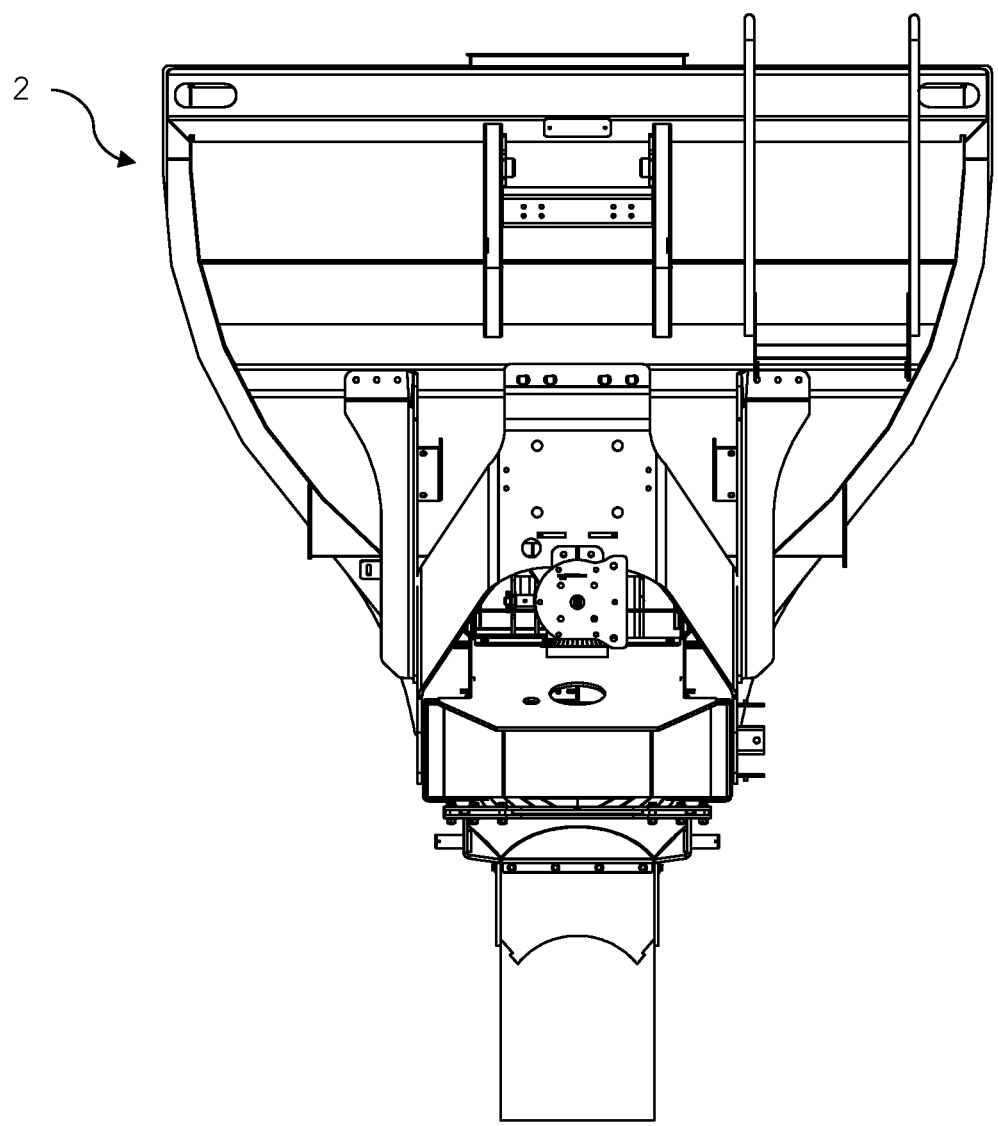
FIG. 16 is a rear view of an assembled arcuate hopper.

FIG. 16 is a rear view of a fully welded arcuate aggregate hopper 2 with support braces, mounting hardware and safety covers in place. The support braces are preferably bolted to the wall structures to avoid heat affected zones in the engineered materials that might result in material characteristic compromises. The support structures are also engineered and designed such that once formed, all critical and precision areas are free from deformation and require minimal if any hand fitting during assembly.

Figure 17:
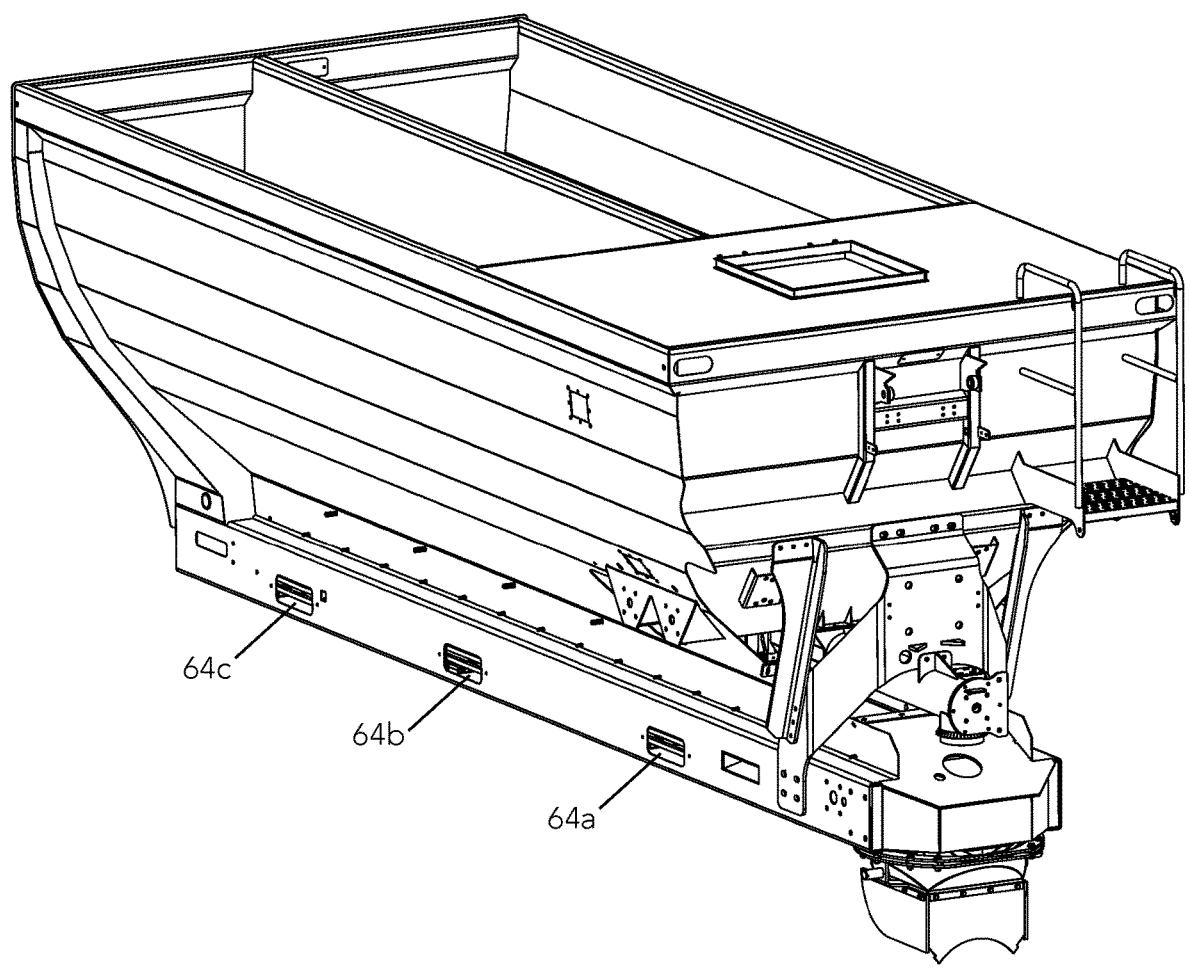
FIG. 17 is a rear isometric view of an assembled arcuate hopper.

FIG. 17 is a rear isometric view of a fully welded arcuate hopper with support braces, mounting hardware and safety covers in place. The top edge is a formed box structure to increase strength and rigidity of the entire structure. This area is up armored in preparation for impacts from filling loaders and the like. Several bolt on structures are visible and the lower feed conveyor is visible through the inspection and maintenance ports 64a, 64b, 64c. The arcuate side walls cover the gap between the inner walls and cementitious materials wall to create a protected void for securing sensitive electronics such as moisture probes, LIDAR scanners, and gate position sensors.

Although the present mobile aggregate hopper is shown with elongated sand and stone reservoirs adjacent the front of the hopper (near a truck cab when mounted on a truck chassis) and a square cementitious material reservoir at the rear of the hopper, it is envisaged that the present aggregate hopper may be configured in a variety of other ways, including having more than one interior longitudinal divider wall, and/or more than one lateral interior divider wall, and different exterior geometry. The interior divider walls may each be planar, arcuate, or a combination thereof, and may be configured and secured in any way that provides the desired volume and number of reservoirs for the application. Each reservoir defined by at least one interior divider wall may be of varying shape, size, and volume, and may optionally be fitted with one or more vibrator for improving gravity-assisted solid material flow and or fluidization. The configurations and geometries of each bin are defined by the locations an intersecting angles of the dividing walls which can also be of a right or non-right angle.

Figure 18:
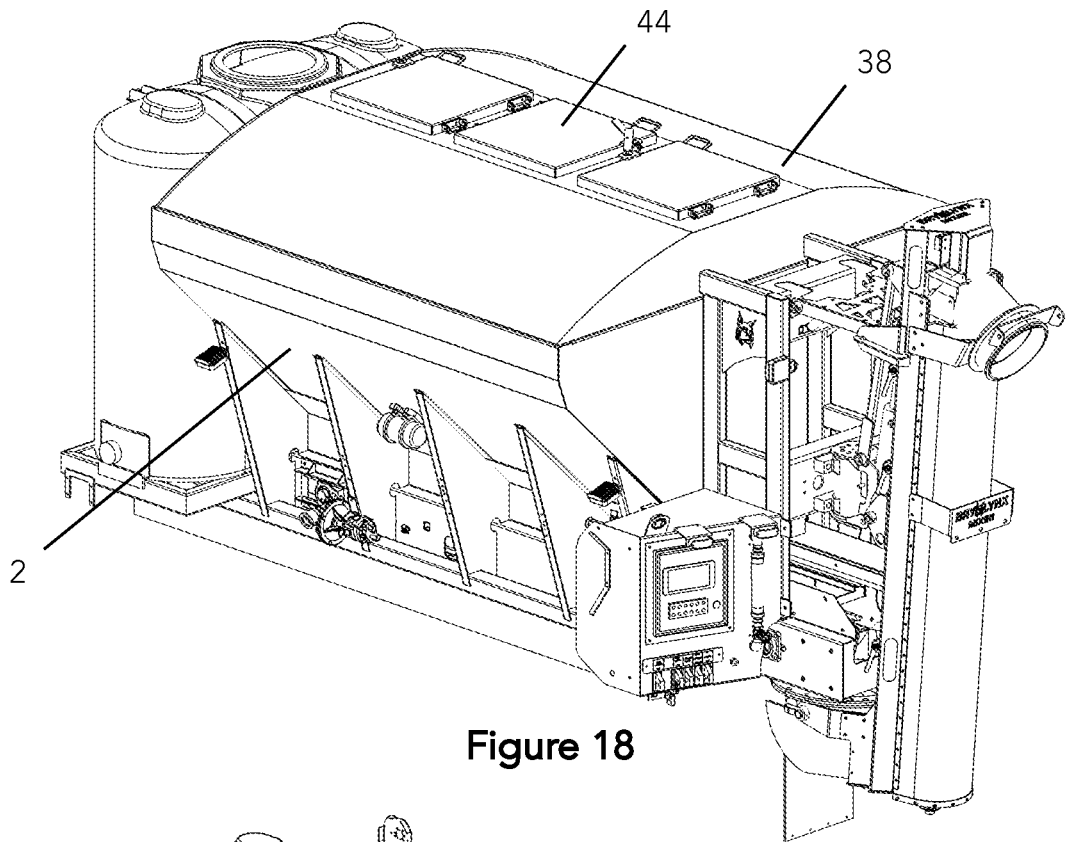
FIG. 18 is a side isometric view of an arcuate hopper with arcuate roof.

FIG. 18 is a side isometric view of an arcuate hopper 2 with an arcuate hopper roof 38 covering the hopper. Like the arcuate longitudinal side walls, the hopper roof can be of a single sheet of high performance steel. The arcuate hopper roof 38 can be of a bump stepped or rolled design and can also function as a structural member. The arcuate shape can facilitate over loading (above the side walls) for applications where overall width is limited. The arcuate shape of the roof top can also work in conjunction with the arcuate walls to reduce the required strength of the walls by transmitting the load forces across the top of the storage tank. This is effectively emulating a cylindrical tank for strength purposes while still facilitating a bottom mounted conveyor system for metering and discharging materials. The top cover can also be fitted with one or more loading and/or access hatches that are preferably water tight. A hopper roof hatch 44 provides access from the outside into the hopper for filling the hopper with aggregate material while protecting the aggregate inside the hopper from unwanted contact with water or humidity which may promote premature hardening of the cementitious material inside. Premixed aggregate material compositions are available with two or more of the concrete ingredients blended offsite before loading into one or more storage bins or hoppers. These pre-blended materials can comprise, for example, different aggregates, aggregates and water, cement powder and aggregates, stone and powdered admixture, or combinations thereof, providing that the cementitious material is kept away from fluids prior to formulation to prevent premature crystallization or hardening. The purpose of using a premixed aggregate is to facilitate more ingredient options, often temporarily, into the ingredients dosed by a volumetric mixer. For example if it is known that two parts stone are needed for every one part sand, a pre-blended 2:1 ratio of stone to sand can be formulated and added to a single storage bin allowing use of a tertiary aggregate if required. Alternatively, if a special admixture is required for a job, a powdered form of this admixture can be preblended into the sand at an appropriate rate for effective automatic dosing based on the dosage of the sand. A computerized control can accommodate such changes to the mix design ingredients. There is a potential for one or more of the preblended materials to be water or light sensitive. In particular, cementitious materials stored in the hopper are sensitive to moisture and covering reservoirs containing sensitive materials can prolong the life of and delay hardening of these materials. As such, an arcuate top can be added to the primary bulk storage bins providing a more controlled environment for sensitive materials therein.

Figure 19:
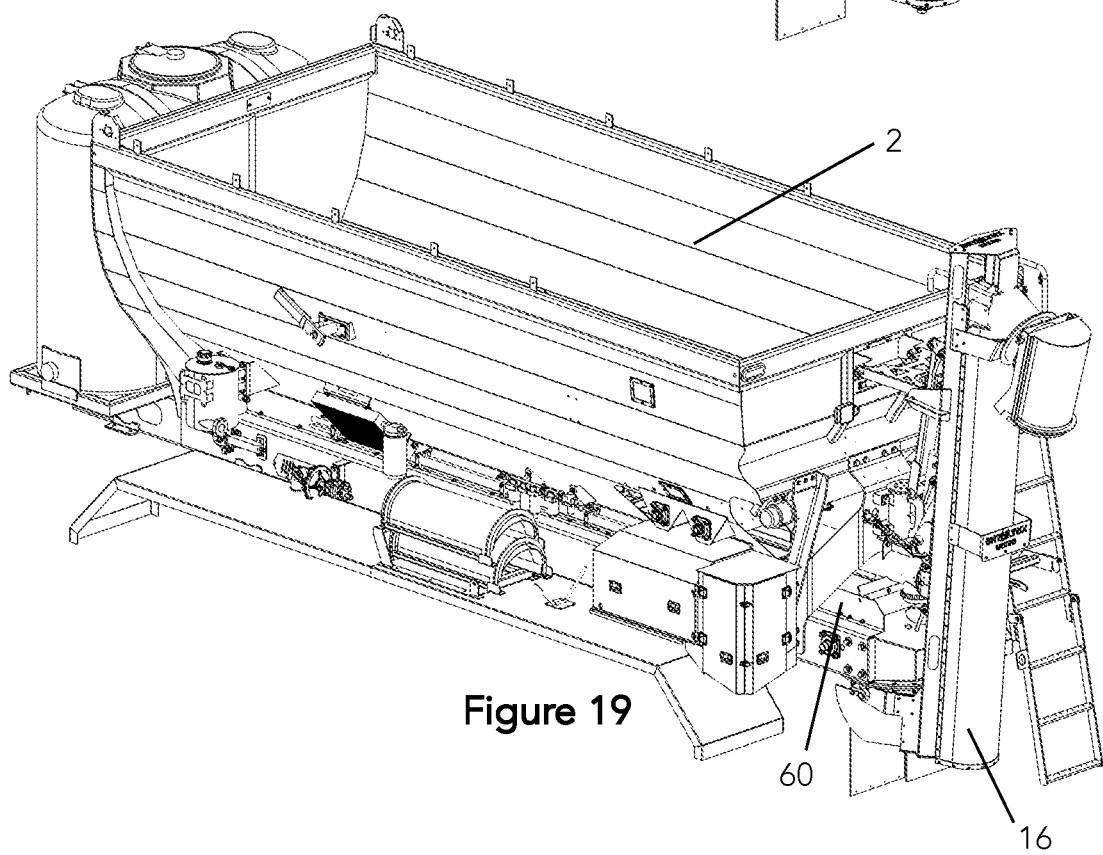
FIG. 19 is a side isometric view of an arcuate hopper with no interior walls.

FIG. 19 is a side isometric view of an arcuate hopper 2 with no interior walls. An arcuate hopper of this design comprising a pre-mixed aggregate and cementitious material reservoir, integrated transfer conveyor belt 60, and discharge auger 16 can be used with pre-blended or pre-mixed materials with the addition of a protective roof (not shown). The presently described volumetric mixer can used to make, among other products, normal weight concrete, heavyweight concrete, lightweight concrete, high performance concrete, insulating concrete, pervious concrete, zero slump concrete, self-consolidating concrete, flowable fill, gunite, shotcrete, latex modified concrete, and mortar mix. It can produce colored concrete, fiber concrete, rapid setting concrete, roller compacted concrete, and any other type of concrete that can be produced by a concrete mixer. The presently described volumetric mixer can be a stationary or a mobile concrete plant, capable of producing a continuous stream of concrete or cementitious materials.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:
1. A mobile aggregate hopper comprising:
a pair of arcuate longitudinal side walls, each of the pair of arcuate longitudinal side walls made from a separate single sheet structure and defining a bottom discharge;
a front end wall between the pair of arcuate longitudinal side walls;
a rear end wall between the pair of arcuate longitudinal side walls, the pair of arcuate longitudinal side walls, the front end wall, and the rear end wall defining a storage hopper with a top edge defining an open top end;
a conveyor belt assembly disposed below the pair of arcuate longitudinal side walls and the bottom discharge operable to receive aggregate material; and
an integrated base enclosing the conveyor assembly, the integrated base comprising walls continuous with the pair of arcuate longitudinal side walls.

2. The hopper of claim 1, further comprising a longitudinal divider wall extending between the front end wall and the rear end wall defining two aggregate bins.

3. The hopper of claim 1, wherein the pair of arcuate longitudinal side walls, front end wall, and rear end wall define an aggregate bin for receiving pre-mixed aggregate.

4. The hopper of claim 1, wherein the single sheet structure comprises steel which has bending and strength properties to retain an arcuate shape of the pair of arcuate longitudinal side walls after bending.

5. The hopper of claim 1, wherein at least one of the pair of arcuate longitudinal side walls and one side of the integrated base are formed from a continuous sheet structure.

6. The hopper of claim 1, further comprising at least one support brace extending between the pair of arcuate longitudinal side walls.

7. The hopper of claim 1, wherein the pair of arcuate longitudinal side walls are shaped by step bending.

8. The hopper of claim 1, further comprising at least one transverse interior divider wall extending between the pair of arcuate longitudinal side walls.

9. The hopper of claim 1, further comprising at least one base brace extending between the pair of arcuate longitudinal side walls.

10. The hopper of claim 1, further comprising a hopper roof extending between the pair of arcuate longitudinal side walls for covering the open top end of the hopper.

11. A volumetric mixer comprising:
an aggregate hopper comprising:
- a pair of arcuate longitudinal side, each of the pair of arcuate longitudinal side walls made from a separate single sheet structure and defining a bottom discharge;
- a front end wall between the pair of arcuate longitudinal side walls; and
- a rear end wall between the pair of arcuate longitudinal side walls, the pair of arcuate longitudinal side walls, the front end wall, and the rear end wall defining an aggregate hopper with a top edge defining an open top end;

a conveyor belt assembly disposed below the pair of arcuate longitudinal side walls and the bottom discharge operable to receive aggregate material from the aggregate hopper;

an integrated base enclosing the conveyor assembly, the integrated base comprising walls continuous with the pair of arcuate longitudinal side walls; and a chassis comprising wheels for supporting the aggregate hopper.

12. The volumetric mixer of claim 11, further comprising a discharge auger for receiving aggregate material from the conveyor belt assembly.

13. The volumetric mixer of claim 11, further comprising a transverse interior divider wall extending between the pair of arcuate longitudinal side walls.

14. The volumetric mixer of claim 13, wherein the transverse interior divider wall, the pair of arcuate longitudinal side walls, and one of the front end wall or the back end wall define a cementitious material bin.

15. The volumetric mixer of claim 11, wherein each of the pair of arcuate longitudinal side walls comprise a single sheet structure.

16. The volumetric mixer of claim 11, further comprising a hopper roof extending between the pair of arcuate longitudinal side walls for covering the open top end of the hopper.

17. The volumetric mixer of claim 11 further comprising a liquid storage tank.

18. The volumetric mixer of claim 11, further comprising one or more vibrators to vibrate at least one of the pair of arcuate longitudinal side walls.

19. The volumetric mixer of claim 11, further comprising a longitudinal divider wall extending between the front end wall and the rear end wall.

* * * * *